US011237362B2

(12) United States Patent
Lin et al.

(10) Patent No.: US 11,237,362 B2

(45) Date of Patent: Feb. 1, 2022

(54) ELECTRONIC DEVICE

(71) Applicant: LARGAN PRECISION CO.,LTD., Taichung (TW)

(72) Inventors: Yu Jui Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 219 days.

(21) Appl. No.: 16/460,910

(22) Filed: Jul. 2, 2019

(65) Prior Publication Data

US 2020/0249433 A1 Aug. 6, 2020

(30) Foreign Application Priority Data

Jan. 31, 2019 (TW) ................................ 108103845

(51) Int. Cl.

*G02B 13/00* (2006.01)
*G02B 9/34* (2006.01)
*G02B 9/58* (2006.01)

(52) U.S. Cl.

CPC ............ *G02B 13/004* (2013.01); *G02B 9/34* (2013.01); *G02B 9/58* (2013.01)

(58) Field of Classification Search

CPC ........ G02B 13/004; G02B 9/58; G02B 13/06; G02B 13/18; G02B 9/34–58; G02B 3/04
USPC ........................................................ 359/715
See application file for complete search history.

(56) References Cited

U.S. PATENT DOCUMENTS 9,354,425 B2 5/2016 Lin et al.
9,798,105 B2 10/2017 Huang et al.
2015/0085382 A1* 3/2015 Choi ..................... G02B 13/04 359/715
2016/0116710 A1 4/2016 Liang
2018/0307000 A1 10/2018 Lai et al.

FOREIGN PATENT DOCUMENTS

CN 105093501 A 11/2015
CN 205210401 U 5/2016
WO 2020-134128 A1 7/2020

OTHER PUBLICATIONS

CN Office Action in Application No. 201910132149.8 dated Apr. 2, 2021.
TW Office Action dated May 10, 2019 as received in Application No. 108103845.

* cited by examiner

*Primary Examiner* — Marin Pichler
*Assistant Examiner* — Alberto J Betancourt
(74) *Attorney, Agent, or Firm* — Maschoff Brennan

(57) ABSTRACT

An electronic device includes an optical lens assembly. The optical lens assembly includes four lens elements which are, in order from an outer side to an inner side: a first lens element, a second lens element, a third lens element and a fourth lens element. The first lens element has negative refractive power. An outer-side surface of the first lens element is concave in a paraxial region thereof and has at least one convex critical point in an off-axis region thereof. The third lens element has positive refractive power. The fourth lens element has an inner-side surface being convex in a paraxial region thereof and having at least one concave critical point in an off-axis region thereof. The optical lens assembly has a total of four lens elements.

23 Claims, 24 Drawing Sheets

410 400 420 401 430 440 450 460 470 411 412 421 422 431 432 441 442

ELECTRONIC DEVICE

RELATED APPLICATIONS

This application claims priority to Taiwan Application 108103845, filed on Jan. 31, 2019, which is incorporated by reference herein in its entirety.

BACKGROUND

Technical Field

The present disclosure relates to an electronic device, more particularly to an electronic device including an optical lens assembly.

Description of Related Art

With the ever advancing innovation of semiconductor manufacturing technology, the specifications of photographing modules provided with electronic devices are becoming more diverse for various applications. For example, electronic devices equipped with image capturing units featuring a wide field of view are becoming more popular on the market. In addition, with the trend of compactness in electronic devices, modules in electronic devices are now characterized towards multi-functionality or integrated with modules featuring other functions. For example, an image capturing module can also be utilized as a signal receiving module. However, miniaturization becomes difficult for a conventional wide-angle camera due to its long total track length, a small aperture, poor image quality or lens elements having large diameters.

SUMMARY

According to one aspect of the present disclosure, an electronic device includes an optical lens assembly. The optical lens assembly includes four lens elements, and the four lens elements are, in order from an outer side to an inner side, a first lens element, a second lens element, a third lens element and a fourth lens element.

The first lens element has negative refractive power. An outer-side surface of the first lens element is concave in a paraxial region thereof and has at least one convex critical point in an off-axis region thereof. The third lens element has positive refractive power. The fourth lens element has an inner-side surface being convex in a paraxial region thereof and having at least one concave critical point in an off-axis region thereof. The optical lens assembly has a total of four lens elements.

When a central thickness of the first lens element is CT1, a central thickness of the second lens element is CT2, an axial distance between the first lens element and the second lens element is T12, an axial distance between the second lens element and the third lens element is T23, and an axial distance between the third lens element and the fourth lens element is T34, the following conditions are satisfied:

$$CT1/CT2<0.75; \text{ and}$$

$$1.75<T12/(T23+T34).$$

According to another aspect of the present disclosure, an electronic device includes an optical lens assembly. The optical lens assembly includes four lens elements, and the four lens elements are, in order from an outer side to an inner side, a first lens element, a second lens element, a third lens element and a fourth lens element.

The first lens element has negative refractive power. An outer-side surface of the first lens element is concave in a paraxial region thereof and has at least one convex critical point in an off-axis region thereof. The third lens element has positive refractive power. The fourth lens element has an inner-side surface being convex in a paraxial region thereof and having at least one concave critical point in an off-axis region thereof. The optical lens assembly has a total of four lens elements.

When a central thickness of the first lens element is CT1, a central thickness of the second lens element is CT2, an axial distance between the first lens element and the second lens element is T12, an axial distance between the second lens element and the third lens element is T23, an axial distance between the third lens element and the fourth lens element is T34, a curvature radius of the outer-side surface of the first lens element is R1, and a curvature radius of an inner-side surface of the first lens element is R2, the following conditions are satisfied:

$$CT1/CT2<0.75;$$

$$0.80<T12/(T23+T34); \text{ and}$$

$$(R1+R2)/(R1-R2)<0.70.$$

BRIEF DESCRIPTION OF THE DRAWINGS

The disclosure can be better understood by reading the following detailed description of the embodiments, with reference made to the accompanying drawings as follows.

DETAILED DESCRIPTION

An electronic device includes an optical lens assembly, and the optical lens assembly includes four lens elements. The four lens elements are, in order from an outer side to an inner side, a first lens element, a second lens element, a third lens element and a fourth lens element.

Figure 24:
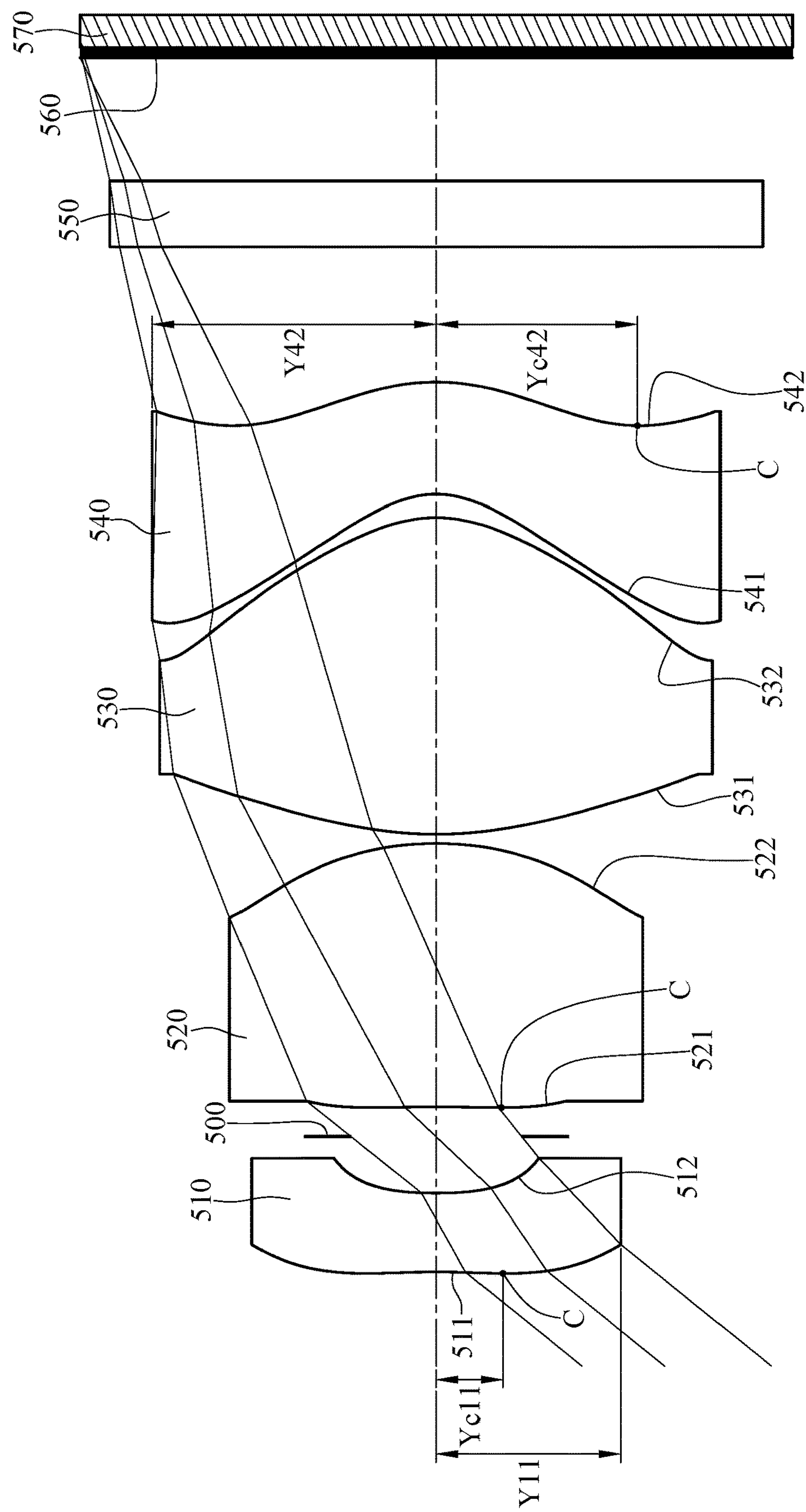
FIG. 24 shows a schematic view of Y11, Y42, Yc11, Yc42 and critical points of the first lens element, the second lens element and the fourth lens element according to the 5th embodiment of the present disclosure.

The first lens element has negative refractive power, and an outer-side surface of the first lens element is concave in a paraxial region thereof and has at least one convex critical point in an off-axis region thereof. Therefore, it is favorable for reducing the effective radius of the first lens element, thereby obtaining a compact size of the optical lens assembly applicable to electronic devices having relatively limited accommodation space. Please refer to FIG. 24, which shows a schematic view of a convex critical point C of the outer-side surface 511 of the first lens element 510 according to the 5th embodiment of the present disclosure.

The second lens element can have positive refractive power, the second lens element can have an outer-side surface being concave in a paraxial region thereof and having at least one convex critical point in an off-axis region thereof. Therefore, it is favorable for balancing the refractive power of the first lens element and correcting chromatic aberration. Please refer to FIG. 24, which shows a schematic view of a convex critical point C of the outer-side surface 521 of the second lens element 520 according to the 5th embodiment of the present disclosure.

The third lens element has positive refractive power. Therefore, it is favorable for providing significant light converging capability so as to control the size of the camera. The third lens element can have an outer-side surface being convex in a paraxial region thereof and an inner-side surface being convex in a paraxial region thereof. Therefore, it is favorable for effectively controlling an incident angle of light rays on the image surface so as to ensure that the image surface receives sufficient amount of light, thereby increasing illuminance on the peripheral region of the image surface and ensuring good quality of peripheral image identification for various applications.

The fourth lens element has an inner-side surface being convex in a paraxial region thereof and having at least one concave critical point in an off-axis region thereof. Therefore, it is favorable for the fourth lens element to collaborate with the third lens element having stronger positive refractive power so as to prevent excessive correction of aberrations. Please refer to FIG. 24, which shows a schematic view of a concave critical point C of the inner-side surface 542 of the fourth lens element 540 according to the 5th embodiment of the present disclosure.

When a central thickness of the first lens element is CT1, and a central thickness of the second lens element is CT2, the following condition is satisfied: $CT1/CT2<0.75$. Therefore, it is favorable for obtaining good space utilization, preventing the first lens element from being overly thick for ensuring the miniaturization of the optical lens assembly, and increasing the manufacturing feasibility of the first lens element. Moreover, the following condition can also be satisfied: $0.10<CT1/CT2<0.50$.

When an axial distance between the first lens element and the second lens element is T12, an axial distance between the second lens element and the third lens element is T23, and an axial distance between the third lens element and the fourth lens element is T34, the following condition is satisfied: $0.80<T12/(T23+T34)$. Therefore, it is favorable for ensuring sufficient space between the first and second lens elements, and gathering light rays from a wide angle in the camera by the first lens element so as to satisfy the requirement of a wide field of view. Moreover, the following condition can also be satisfied: $1.75<T12/(T23+T34)$. Moreover, the following condition can also be satisfied: $1.50<T12/(T23+T34)<7.0$. Moreover, the following condition can also be satisfied: $2.0<T12/(T23+T34)<5.0$.

When a curvature radius of the outer-side surface of the first lens element is R1, and a curvature radius of an inner-side surface of the first lens element is R2, the following condition can be satisfied: $(R1+R2)/(R1-R2)<0.70$. Therefore, it is favorable for reducing the effective radius of the first lens element, and thereby a configuration of the optical lens assembly featuring small size is applicable to electronic devices having relatively limited accommodation space. Moreover, the following condition can also be satisfied: $(R1+R2)/(R1-R2)<0.40$. Moreover, the following condition can also be satisfied: $-0.50<(R1+R2)/(R1-R2)<0.50$.

When a curvature radius of an outer-side surface of the fourth lens element is R7, a curvature radius of the inner-side surface of the fourth lens element is R8, and a focal length of the optical lens assembly is f, the following condition can be satisfied: $-1.50<R7/f+R8/f<-0.30$. Therefore, it is favorable for configuring the fourth lens element with the third lens element having stronger positive refractive power so as to prevent excessive correction of aberrations.

When a maximum effective radius of the outer-side surface of the first lens element is Y11, and a maximum effective radius of the inner-side surface of the fourth lens element is Y42, the following condition can be satisfied: $1.0<Y42/Y11<2.0$. Therefore, it is favorable for utilizing space in the optical lens assembly by preventing one side of the barrel from being overly large, thereby favorable for reducing the size of the optical lens assembly. Moreover, the following condition can also be satisfied: $1.20<Y42/Y11<1.70$. Please refer to FIG. 24, which shows a schematic view of Y11 and Y42 according to the 5th embodiment of the present disclosure.

When a vertical distance between a critical point on the outer-side surface of the first lens element and an optical axis is Yc11, and the focal length of the optical lens assembly is f, the following condition can be satisfied: $0.12<Yc11/f<0.50$. Therefore, it is favorable for reducing the effective radius of the first lens element, thereby obtaining a compact size of the optical lens assembly applicable to electronic devices with relatively limited accommodation space. Please refer to FIG. 24, which shows a schematic view of Yc11 according to the 5th embodiment of the present disclosure.

When a vertical distance between a critical point on the inner-side surface of the fourth lens element and the optical axis is Yc42, and the focal length of the optical lens assembly is f, the following condition can be satisfied: $0.40<Yc42/f<1.0$. Therefore, it is favorable for the configuration of the fourth lens element to correct the peripheral regions of an image. Please refer to FIG. 24, which shows a schematic view of Yc42 according to the 5th embodiment of the present disclosure.

When an Abbe number of the first lens element is V1, an Abbe number of the second lens element is V2, an Abbe number of the third lens element is V3, an Abbe number of the fourth lens element is V4, an Abbe number of the i-th lens element is Vi, a refractive index of the first lens element is N1, a refractive index of the second lens element is N2, a refractive index of the third lens element is N3, a refractive index of the fourth lens element is N4, and a refractive index of the i-th lens element is Ni, at least one lens element of the optical lens assembly can satisfy the following condition: $8.0<Vi/Ni<12.0$, wherein i=1, 2, 3 or 4. Therefore, it is favorable for further correcting chromatic aberration. Moreover, the following condition can also be satisfied: $8.0<V4/N4<12.0$.

When a central thickness of the second lens element is CT2, and a central thickness of the third lens element is CT3, the following condition can be satisfied: $CT2/CT3<0.90$. Therefore, it is favorable for preventing the second lens element from being overly thick so as to ensure good space utilization, thereby miniaturizing the optical lens assembly.

When the focal length of the optical lens assembly is f, and the curvature radius of the outer-side surface of the first lens element is R1, the following condition can be satisfied: $-1.0<f/R1<-0.20$. Therefore, it is favorable for reducing the effective radius of the first lens element and thereby reducing the size of the optical lens assembly, so the optical lens assembly is applicable to electronic devices having relatively limited accommodation space.

When the focal length of the optical lens assembly is f, and the curvature radius of the inner-side surface of the fourth lens element is R8, the following condition can be satisfied: $f/R8<-1.0$. Therefore, it is favorable for configuring the fourth lens element with the third lens element having stronger positive refractive power so as to prevent overcorrecting aberrations.

When the central thickness of the first lens element is CT1, and the axial distance between the first lens element and the second lens element is T12, the following condition can be satisfied: $0.50<CT1/T12<1.50$. Therefore, it is favorable for providing sufficient space between the first and second lens elements, and gathering light rays from a wide angle in the camera by the first lens element so as to satisfy the requirement of a wide field of view.

When an axial distance between the outer-side surface of the first lens element and the inner-side surface of the fourth lens element is Td, and an axial distance between the inner-side surface of the fourth lens element and an image surface is BL, the following condition can be satisfied: $2.20<Td/BL<5.0$. Therefore, it is favorable for obtaining a balance between miniaturization and manufacturing feasibility of the optical lens assembly.

According to the present disclosure, the aforementioned features and conditions can be utilized in numerous combinations so as to achieve corresponding effects.

According to the present disclosure, the lens elements of the optical lens assembly can be made of either glass or plastic material. When the lens elements are made of glass material, the refractive power distribution of the optical lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows more control variables for eliminating aberrations thereof, the required number of the lens elements can be reduced, and the total track length of the optical lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which alters the lens elements' transmittance in a specific range of wavelength for a reduction in unwanted stray light or colour deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding.

According to the present disclosure, each of an outer-side surface and an inner-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, when the parameters of the optical lens assembly, image capturing unit, receiving device and electronic device are not specifically defined, these parameters may be determined according to the operating wavelength range. For example, when the operating wavelength range is a wavelength range of visible light (e.g., 350 nm to 750 nm), these parameters are defined at the wavelength of helium d-line; when the operating wavelength range is a wavelength range of near infrared light (e.g., 750 nm to 1600 nm), these parameters are defined at the wavelength of 940 nm.

According to the present disclosure, a critical point is a non-axial point of the lens surface where its tangent is perpendicular to the optical axis.

According to the present disclosure, an image surface of the optical lens assembly, based on the corresponding image sensor, can be flat or curved, especially a curved surface being concave facing towards the outer side of the optical lens assembly.

According to the present disclosure, an image correction unit, such as a field flattener, can be optionally disposed between the lens element closest to the inner side of the optical lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of an image capturing unit. In general, a preferable image correction unit is, for example, a thin transparent element having a concave outer-side surface and a planar inner-side surface, and the thin transparent element is disposed near the image surface.

According to the present disclosure, the optical lens assembly can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical lens assembly and thereby provides a wider field of view for the same.

According to the present disclosure, the optical lens assembly can include an aperture control unit. The aperture control unit may be a mechanical component or a light modulator, which can control the size and shape of the aperture through electricity or electrical signals. The mechanical component can include a movable member, such as a blade assembly or a light baffle. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, said outer side indicates the outside of an electronic device, and said inner side indicates the inside of the electronic device. As for the optical lens assembly featuring light receiving function, the outer side of the optical lens assembly is an object side of the optical lens assembly, and the inner side of the optical lens assembly is an image side of the optical lens assembly. As for any lens element of the optical lens assembly featuring light receiving function, an outer-side surface of the lens element is a lens surface facing toward the object side, and an inner-side surface of the lens element is a lens surface facing toward the image side. As for the optical lens assembly featuring light projecting function, the outer side of the optical lens assembly is a magnifying side of the optical lens assembly closer to a detected object, and the inner side of the optical lens assembly is a reducing side of the optical lens assembly closer to a light source. As for any lens element of the optical lens assembly featuring light projecting function, an outer-side surface (i.e., a light emitting surface) of the lens element is a lens surface facing toward the detected object, and an inner-side surface (i.e., a light receiving surface) of the lens element is a lens surface facing toward the light source.

According to the above description of the present disclosure, the following specific embodiments are provided for further explanation.

1st Embodiment

Figure 1:
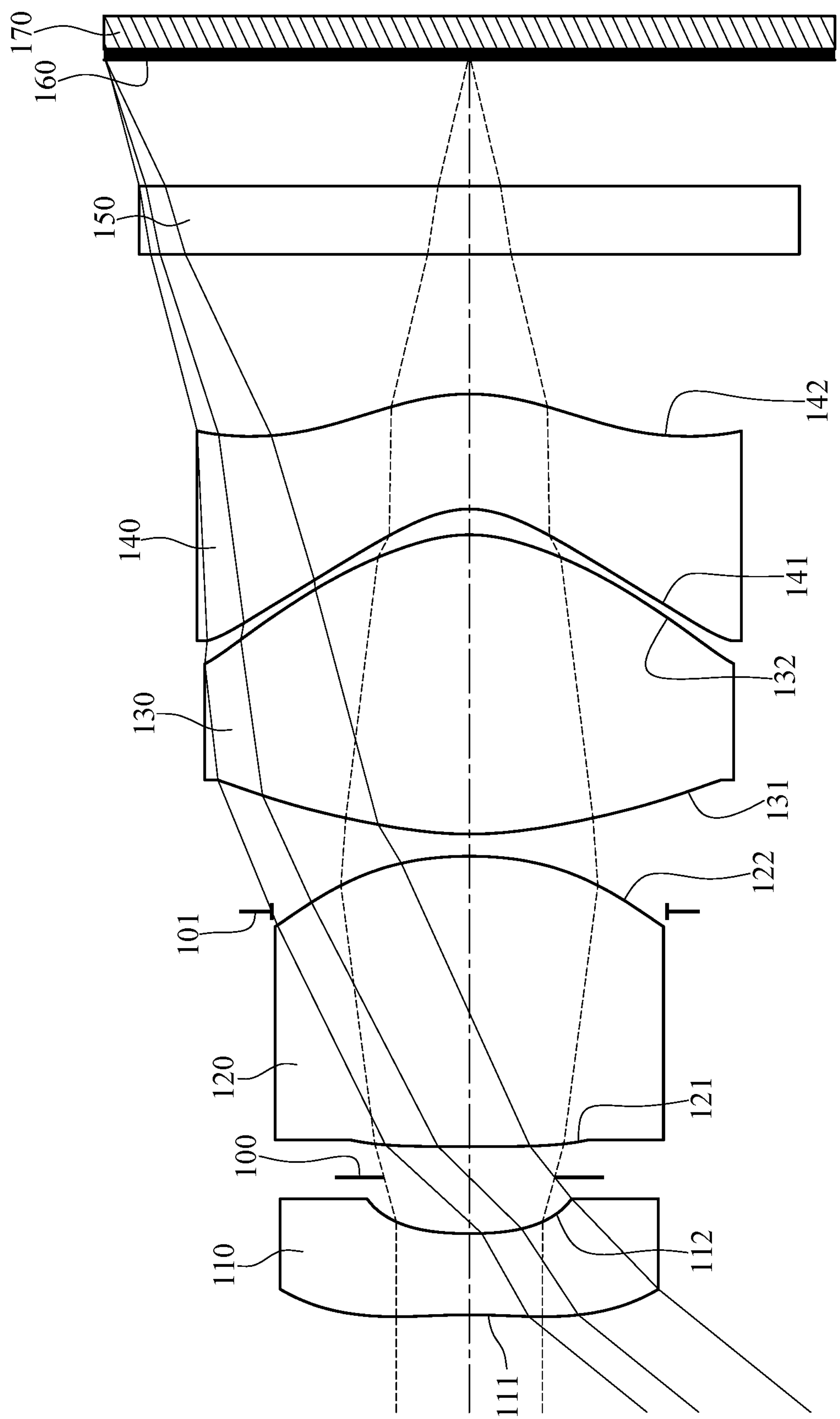
FIG. 1 is a schematic view of an optical lens assembly and an image sensor of an electronic device according to the 1st embodiment of the present disclosure.
Figure 2:
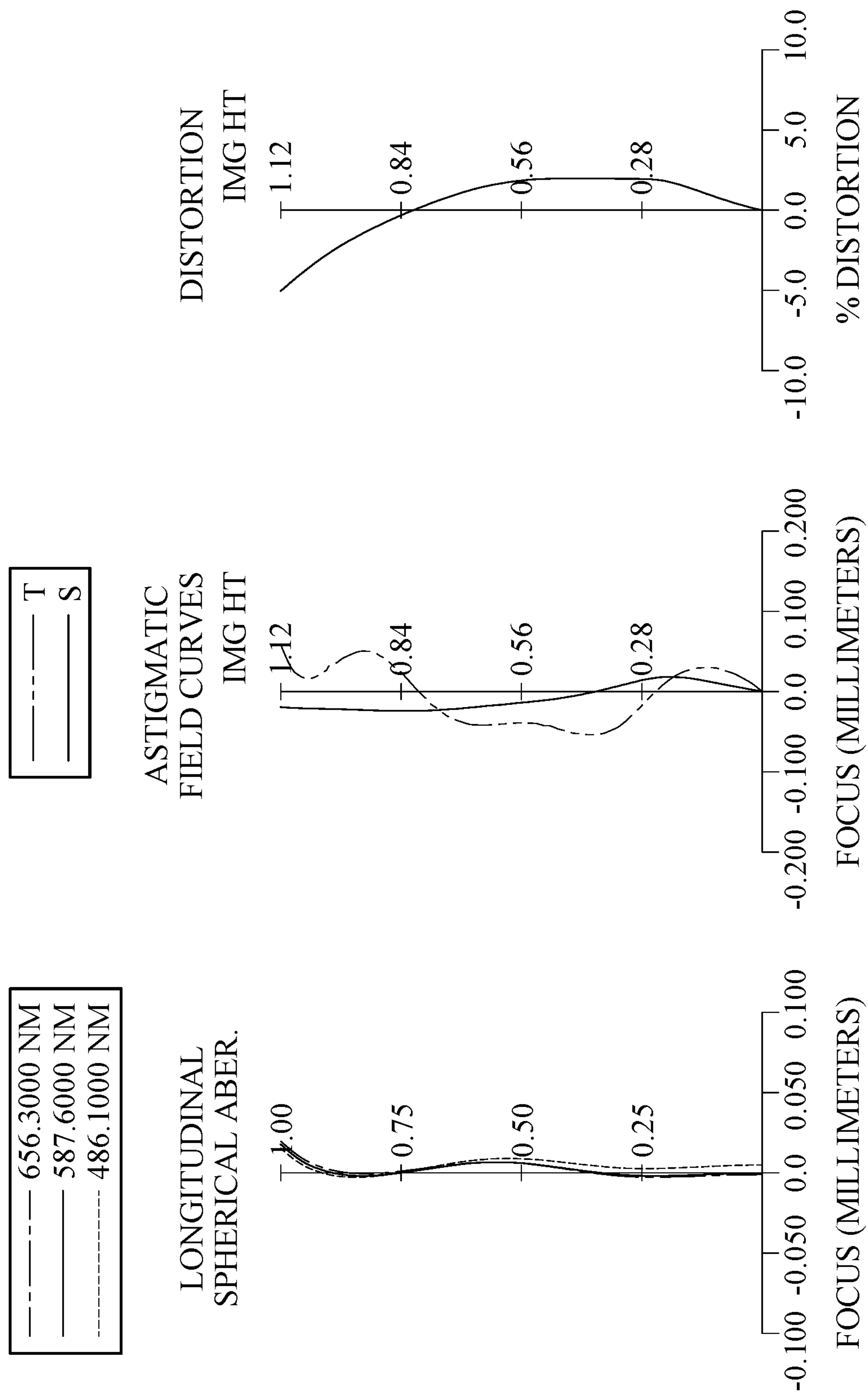
FIG. 2 shows spherical aberration curves, astigmatic field curves and a distortion curve of the optical lens assembly of the electronic device according to the 1st embodiment.

FIG. 1 is a schematic view of an optical lens assembly and an image sensor of an electronic device according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical lens assembly (its reference numeral is omitted) of the present disclosure and an image sensor 170. The optical lens assembly includes, in order from an outer side to an inner side, a first lens element 110, an aperture stop 100, a second lens element 120, a stop 101, a third lens element 130, a fourth lens element 140, an IR-cut filter 150 and an image surface 160. The optical lens assembly includes four lens elements (110, 120, 130 and 140) with no additional lens element disposed between each of the adjacent four lens elements.

The first lens element 110 with negative refractive power has an outer-side surface 111 being concave in a paraxial region thereof and an inner-side surface 112 being concave in a paraxial region thereof. The first lens element 110 is made of plastic material and has the outer-side surface 111 and the inner-side surface 112 being both aspheric. The outer-side surface 111 of the first lens element 110 has at least one convex critical point in an off-axis region thereof.

The second lens element 120 with positive refractive power has an outer-side surface 121 being convex in a paraxial region thereof and an inner-side surface 122 being convex in a paraxial region thereof. The second lens element 120 is made of plastic material and has the outer-side surface 121 and the inner-side surface 122 being both aspheric.

The third lens element 130 with positive refractive power has an outer-side surface 131 being convex in a paraxial region thereof and an inner-side surface 132 being convex in a paraxial region thereof. The third lens element 130 is made of plastic material and has the outer-side surface 131 and the inner-side surface 132 being both aspheric.

The fourth lens element 140 with negative refractive power has an outer-side surface 141 being concave in a paraxial region thereof and an inner-side surface 142 being convex in a paraxial region thereof. The fourth lens element 140 is made of plastic material and has the outer-side surface 141 and the inner-side surface 142 being both aspheric. The inner-side surface 142 of the fourth lens element 140 has at least one concave critical point in an off-axis region thereof.

The IR-cut filter 150 is made of glass material and located between the fourth lens element 140 and the image surface 160, and will not affect the focal length of the optical lens assembly. The image sensor 170 is disposed on or near the image surface 160 of the optical lens assembly.

The equation of the aspheric surface profiles of the aforementioned lens elements of the 1st embodiment is expressed as follows:

$$X(Y) = (Y^2/R)/(1+sqrt(1-(1+k)\times(Y/R)^2)) + \sum_i (Ai)\times(Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14, 16, 18 and 20.

In the optical lens assembly of the image capturing unit according to the 1st embodiment, when a focal length of the optical lens assembly is f, an f-number of the optical lens assembly is Fno, and half of a maximum field of view of the optical lens assembly is HFOV, these parameters have the following values: f=0.95 millimeters (mm), Fno=2.12, HFOV=51.0 degrees (deg.).

When an Abbe number of the first lens element 110 is V1, and a refractive index of the first lens element 110 is N1, the following condition is satisfied: V1/N1=36.30.

When an Abbe number of the second lens element 120 is V2, and a refractive index of the second lens element 120 is N2, the following condition is satisfied: V2/N2=36.26.

When an Abbe number of the third lens element 130 is V3, and a refractive index of the third lens element 130 is N3, the following condition is satisfied: V3/N3=36.26.

When an Abbe number of the fourth lens element 140 is V4, and a refractive index of the fourth lens element 140 is N4, the following condition is satisfied: V4/N4=10.91.

When a central thickness of the first lens element 110 is CT1, and an axial distance between the first lens element 110 and the second lens element 120 is T12, the following condition is satisfied: CT1/T12=0.93. In this embodiment, an axial distance between two adjacent lens elements is an air gap in a paraxial region between the two adjacent lens elements.

When the central thickness of the first lens element 110 is CT1, and a central thickness of the second lens element 120 is CT2, the following condition is satisfied: CT1/CT2=0.28.

When the axial distance between the first lens element 110 and the second lens element 120 is T12, an axial distance between the second lens element 120 and the third lens element 130 is T23, and an axial distance between the third lens element 130 and the fourth lens element 140 is T34, the following condition is satisfied: T12/(T23+T34)=1.82.

When a central thickness of the second lens element 120 is CT2, and a central thickness of the third lens element 130 is CT3, the following condition is satisfied: CT2/CT3=0.97.

When an axial distance between the outer-side surface 111 of the first lens element 110 and the inner-side surface 142 of the fourth lens element 140 is Td, and an axial distance between the inner-side surface 142 of the fourth lens element 140 and the image surface 160 is BL, the following condition is satisfied: Td/BL=2.76.

When a curvature radius of the outer-side surface 111 of the first lens element 110 is R1, and curvature radius of the inner-side surface 112 of the first lens element 110 is R2, the following condition is satisfied: (R1+R2)/(R1−R2)=0.28.

When the focal length of the optical lens assembly is f, and the curvature radius of the outer-side surface 111 of the first lens element 110 is R1, the following condition is satisfied: f/R1=−0.48.

When the focal length of the optical lens assembly is f, and a curvature radius of the inner-side surface 142 of the fourth lens element 140 is R8, the following condition is satisfied: f/R8=−1.49.

When a curvature radius of the outer-side surface 141 of the fourth lens element 140 is R7, the curvature radius of the inner-side surface 142 of the fourth lens element 140 is R8, and the focal length of the optical lens assembly is f, the following condition is satisfied: R7/f+R8/f=−0.98.

When a maximum effective radius of the outer-side surface 111 of the first lens element 110 is Y11, and a maximum effective radius of the inner-side surface 142 of the fourth lens element 140 is Y42, the following condition is satisfied: Y42/Y11=1.44.

When a vertical distance between the critical point on the outer-side surface 111 of the first lens element 110 and the optical axis is Yc11, and the focal length of the optical lens assembly is f, the following condition is satisfied: Yc11/f=0.24.

When a vertical distance between the critical point on the inner-side surface 142 of the fourth lens element 140 and the optical axis is Yc42, and the focal length of the optical lens assembly is f, the following condition is satisfied: Yc42/f=0.70.

The detailed optical data of the 1st embodiment are shown in Table 1 and the aspheric surface data are shown in Table 2 below.

TABLE 1

| 1st Embodiment<br>f = 0.95 mm, Fno = 2.12, HFOV = 51.0 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | −1.993 (ASP) | 0.250 | Plastic | 1.545 | 56.1 | −1.28 |
| 2 | | 1.115 (ASP) | 0.173 | | | | |
| 3 | Ape. Stop | Plano | 0.095 | | | | |

TABLE 1-continued

| 1st Embodiment<br>f = 0.95 mm, Fno = 2.12, HFOV = 51.0 deg. | | | | | | | |
|---|---|---|---|---|---|---|---|
| Surface # | | Curvature Radius | Thickness | Material | Index | Abbe # | Focal Length |
| 4 | Lens 2 | 100.000 (ASP) | 0.893 | Plastic | 1.544 | 56.0 | 2.02 |
| 5 | | −1.110 (ASP) | −0.170 | | | | |
| 6 | Stop | Plano | 0.238 | | | | |
| 7 | Lens 3 | 1.129 (ASP) | 0.921 | Plastic | 1.544 | 56.0 | 0.75 |
| 8 | | −0.453 (ASP) | 0.079 | | | | |
| 9 | Lens 4 | −0.295 (ASP) | 0.354 | Plastic | 1.686 | 18.4 | −1.37 |
| 10 | | −0.641 (ASP) | 0.430 | | | | |
| 11 | IR-Cut Filter | Plano | 0.210 | Glass | 1.517 | 64.2 | — |
| 12 | | Plano | 0.387 | | | | |
| 13 | Image | Plano | 0.000 | | | | |

Note:
Reference wavelength is 587.6 nm (d-line).
An effective radius of the stop 101 (Surface 6) is 0.608 mm.

TABLE 2

| Aspheric Coefficients | | | | |
|---|---|---|---|---|
| Surface # | 1 | 2 | 4 | 5 |
| k= | −9.9000E+01 | 0.0000E+00 | 0.0000E+00 | 0.0000E+00 |
| A4= | 2.2199E+00 | 2.0717E+00 | 1.2472E+00 | −9.8032E−01 |
| A6= | −1.2865E+01 | 2.6251E+02 | −3.5554E+01 | −3.7619E+00 |
| A8= | 1.2228E+02 | −9.4014E+03 | 1.6085E+03 | 1.1918E+02 |
| A10= | −1.0147E+03 | 1.6334E+05 | −3.7260E+04 | −1.1530E+03 |
| A12= | 5.7517E+03 | −9.6169E+05 | 5.1465E+05 | 6.4893E+03 |
| A14= | −2.0889E+04 | −1.0249E+07 | −4.3305E+06 | −2.2427E+04 |
| A16= | 4.6781E+04 | 2.0113E+08 | 2.1455E+07 | 4.6614E+04 |
| A18= | −5.9045E+04 | −1.1731E+09 | −5.6517E+07 | −5.3283E+04 |
| A20= | 3.2198E+04 | 2.3477E+09 | 5.9286E+07 | 2.5712E+04 |
| Surface # | 7 | 8 | 9 | 10 |
| k= | −2.1653E+01 | −4.5877E+00 | −2.5671E+00 | −9.7258E−01 |
| A4= | 5.1939E−01 | −1.1067E−01 | 9.0892E−01 | 1.8253E+00 |
| A6= | −5.0350E+00 | 5.1103E−02 | −5.0875E+00 | −2.9034E+00 |
| A8= | 3.4323E+01 | −1.9877E+01 | 1.7407E+01 | 3.1786E+00 |
| A10= | −1.4719E+02 | 1.4709E+02 | −2.9851E+01 | 1.5794E+01 |
| A12= | 4.1363E+02 | −5.0078E+02 | 1.2763E+01 | −9.8762E+01 |
| A14= | −7.4943E+02 | 9.7503E+02 | 2.5298E+01 | 2.4063E+02 |
| A16= | 8.2273E+02 | −1.1311E+03 | −2.4475E+01 | −3.0885E+02 |
| A18= | −4.8272E+02 | 7.3649E+02 | −2.7744E+00 | 2.0646E+02 |
| A20= | 1.1030E+02 | −2.0824E+02 | 6.0458E+00 | −5.6698E+01 |

In Table 1, the curvature radius, the thickness and the focal length are shown in millimeters (mm). Surface numbers 0-13 represent the surfaces sequentially arranged from the outer side to the inner side along the optical axis. In Table 2, k represents the conic coefficient of the equation of the aspheric surface profiles. A4-20 represent the aspheric coefficients ranging from the 4th order to the 20th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
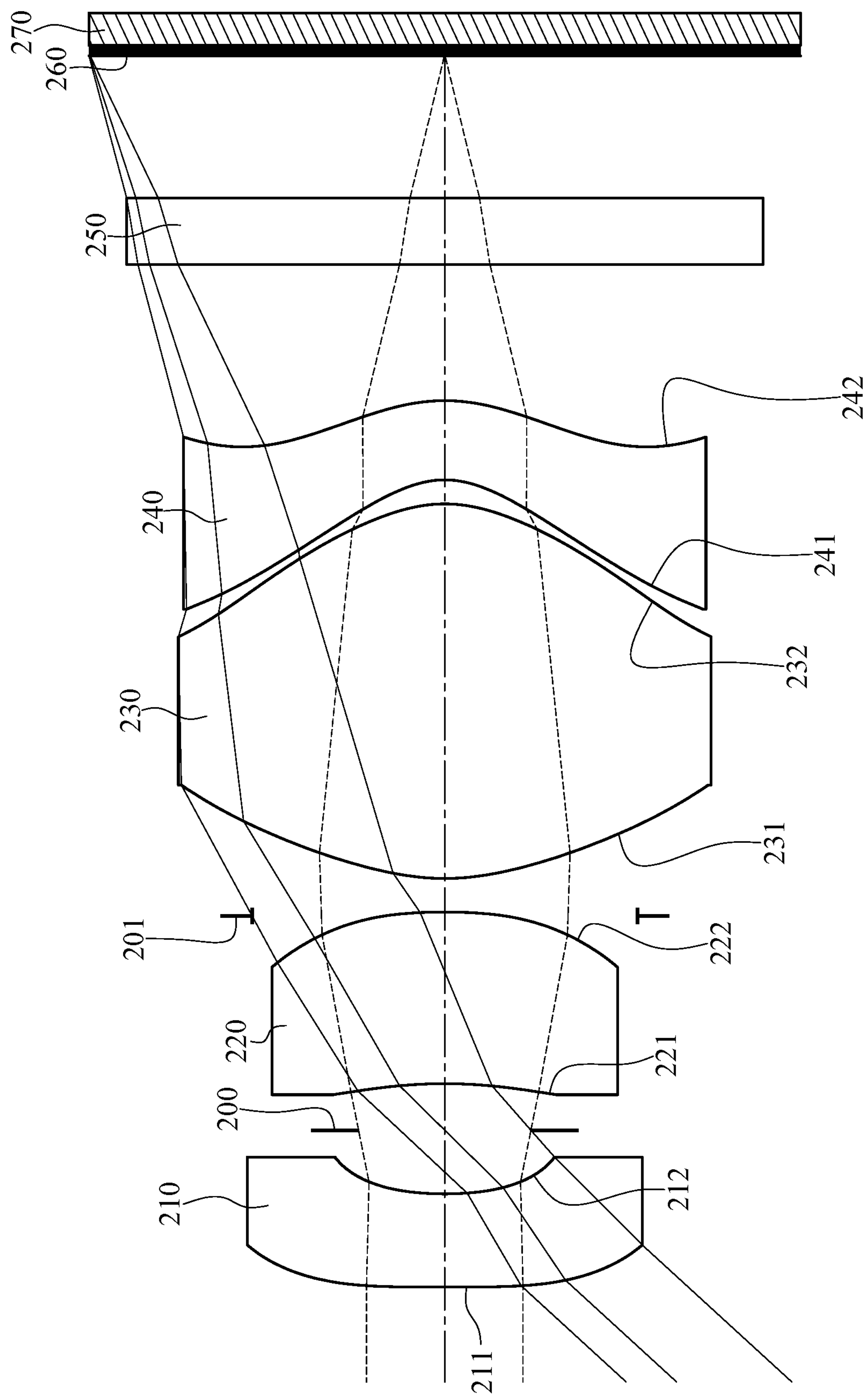
FIG. 3 is a schematic view of an optical lens assembly and an image sensor of an electronic device according to the 2nd embodiment of the present disclosure.
Figure 4:
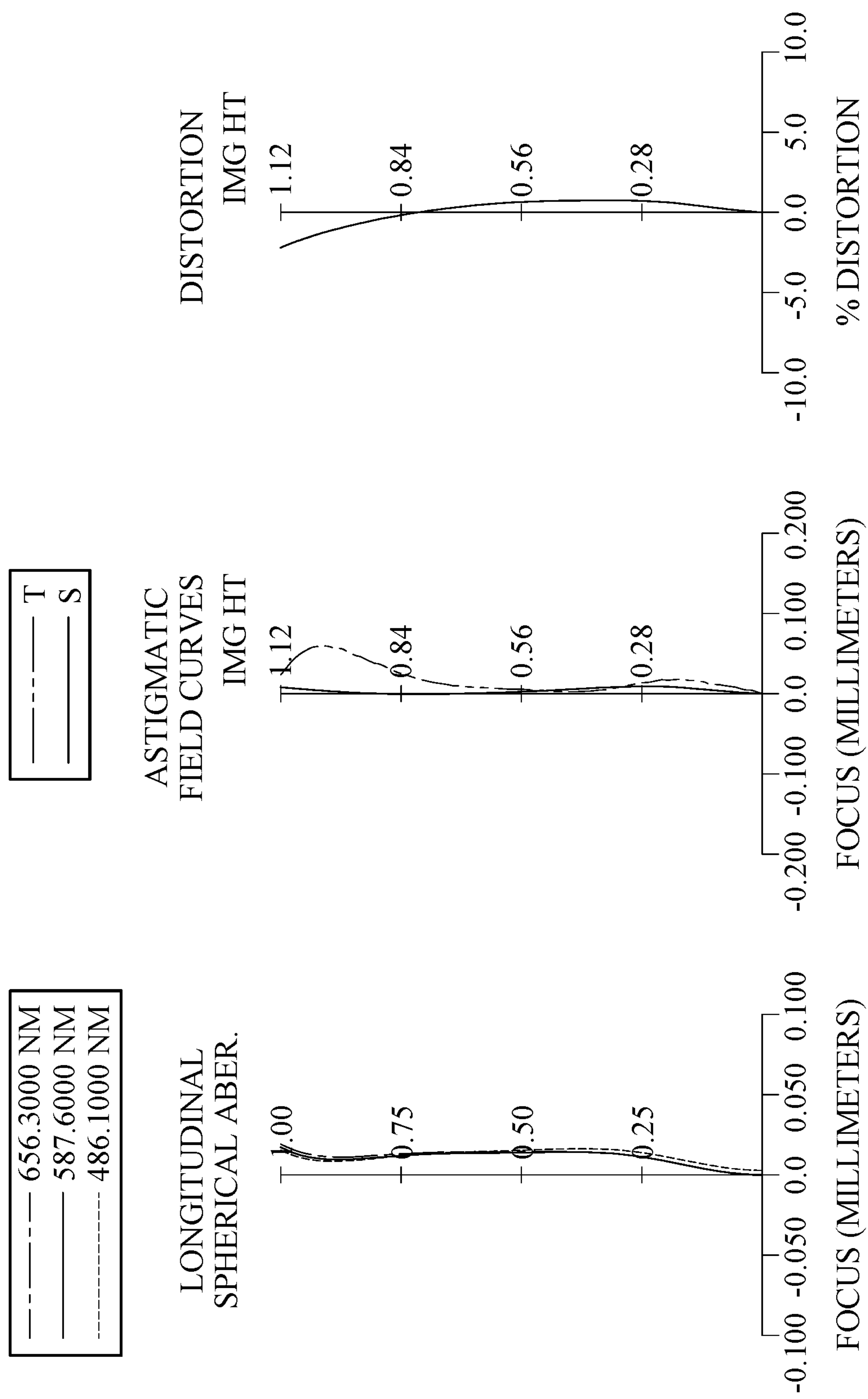
FIG. 4 shows spherical aberration curves, astigmatic field curves and a distortion curve of the optical lens assembly of the electronic device according to the 2nd embodiment.

FIG. 3 is a schematic view of an optical lens assembly and an image sensor of an electronic device according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical lens assembly (its reference numeral is omitted) of the present disclosure and an image sensor 270. The optical lens assembly includes, in order from an outer side to an inner side, a first lens element 210, an aperture stop 200, a second lens element 220, a stop 201, a third lens element 230, a fourth lens element 240, an IR-cut filter 250 and an image surface 260. The optical lens assembly includes four lens elements (210, 220, 230 and 240) with no additional lens element disposed between each of the adjacent four lens elements.

The first lens element 210 with negative refractive power has an outer-side surface 211 being concave in a paraxial region thereof and an inner-side surface 212 being concave in a paraxial region thereof. The first lens element 210 is made of plastic material and has the outer-side surface 211 and the inner-side surface 212 being both aspheric. The outer-side surface 211 of the first lens element 210 has at least one convex critical point in an off-axis region thereof.

The second lens element 220 with negative refractive power has an outer-side surface 221 being concave in a paraxial region thereof and an inner-side surface 222 being convex in a paraxial region thereof. The second lens element 220 is made of plastic material and has the outer-side surface 221 and the inner-side surface 222 being both aspheric.

The third lens element 230 with positive refractive power has an outer-side surface 231 being convex in a paraxial region thereof and an inner-side surface 232 being convex in a paraxial region thereof. The third lens element 230 is made of plastic material and has the outer-side surface 231 and the inner-side surface 232 being both aspheric.

The fourth lens element 240 with negative refractive power has an outer-side surface 241 being concave in a paraxial region thereof and an inner-side surface 242 being convex in a paraxial region thereof. The fourth lens element 240 is made of plastic material and has the outer-side surface 241 and the inner-side surface 242 being both aspheric. The inner-side surface 242 of the fourth lens element 240 has at least one concave critical point in an off-axis region thereof.

The IR-cut filter 250 is made of glass material and located between the fourth lens element 240 and the image surface 260, and will not affect the focal length of the optical lens assembly. The image sensor 270 is disposed on or near the image surface 260 of the optical lens assembly.

The detailed optical data of the 2nd embodiment are shown in Table 3 and the aspheric surface data are shown in Table 4 below.

TABLE 3

| 2nd Embodiment<br>f = 1.05 mm, Fno = 2.12, HFOV = 47.5 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | −40.523 (ASP) | 0.294 | Plastic | 1.544 | 56.0 | −1.86 |
| 2 | | 1.039 (ASP) | 0.201 | | | | |
| 3 | Ape. Stop | Plano | 0.147 | | | | |
| 4 | Lens 2 | −1.516 (ASP) | 0.542 | Plastic | 1.550 | 53.0 | −34.84 |
| 5 | | −1.855 (ASP) | −0.012 | | | | |
| 6 | Stop | Plano | 0.118 | | | | |
| 7 | Lens 3 | 0.734 (ASP) | 1.183 | Plastic | 1.544 | 56.0 | 0.78 |
| 8 | | −0.432 (ASP) | 0.076 | | | | |
| 9 | Lens 4 | −0.283 (ASP) | 0.250 | Plastic | 1.686 | 18.4 | −1.34 |
| 10 | | −0.556 (ASP) | 0.430 | | | | |
| 11 | IR-Cut Filter | Plano | 0.210 | Glass | 1.517 | 64.2 | — |
| 12 | | Plano | 0.449 | | | | |
| 13 | Image | Plano | 0.000 | | | | |

Note:
Reference wavelength is 587.6 nm (d-line).
An effective radius of the stop 201 (Surface 6) is 0.608 mm.

TABLE 4

| Aspheric Coefficients | | | | |
|---|---|---|---|---|
| Surface # | 1 | 2 | 4 | 5 |
| k= | −9.9000E+01 | 0.0000E+00 | 0.0000E+00 | 0.0000E+00 |
| A4= | 1.5453E+00 | 3.4550E+00 | 6.8345E−02 | −2.5986E+00 |
| A6= | −6.4838E+00 | −5.4939E+01 | 1.5537E+01 | 1.7034E+01 |
| A8= | 4.9635E+01 | 3.1992E+03 | −6.2151E+02 | −1.1548E+02 |
| A10= | −3.4513E+02 | −1.0104E+05 | 1.6921E+04 | 6.5580E+02 |
| A12= | 1.7558E+03 | 1.8786E+06 | −2.8510E+05 | −3.0472E+03 |
| A14= | −5.9046E+03 | −2.0746E+07 | 3.0024E+06 | 1.0901E+04 |
| A16= | 1.2338E+04 | 1.3339E+08 | −1.9252E+07 | −2.6827E+04 |
| A18= | −1.4411E+04 | −4.5518E+08 | 6.8572E+07 | 3.8979E+04 |
| A20= | 7.1588E+03 | 6.2896E+08 | −1.0408E+08 | −2.5032E+04 |
| Surface # | 7 | 8 | 9 | 10 |
| k= | −9.7192E+00 | −4.1140E+00 | −2.5207E+00 | −1.1411E+00 |
| A4= | 4.7729E−01 | −6.3383E−01 | 1.4811E−01 | 2.2202E+00 |
| A6= | −2.0910E+00 | 2.3988E+00 | 1.0331E+00 | −6.2857E+00 |
| A8= | 1.0218E+01 | −1.4979E+01 | −7.2017E+00 | 2.2989E+01 |
| A10= | −3.7599E+01 | 7.3121E+01 | 3.6207E+01 | −6.3502E+01 |
| A12= | 9.1515E+01 | −2.1516E+02 | −1.2578E+02 | 1.1651E+02 |
| A14= | −1.3933E+02 | 3.7948E+02 | 2.7166E+02 | −1.3646E+02 |
| A16= | 1.2706E+02 | −3.8815E+02 | −3.4121E+02 | 9.5037E+01 |
| A18= | −6.2966E+01 | 2.0981E+02 | 2.2682E+02 | −3.3967E+01 |
| A20= | 1.2764E+01 | −4.5954E+01 | −6.1648E+01 | 4.2355E+00 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.05 | CT2/CT3 | 0.46 |
| Fno | 2.12 | Td/BL | 2.57 |
| HFOV [deg.] | 47.5 | (R1 + R2)/(R1 − R2) | 0.95 |
| V1/N1 | 36.26 | f/R1 | −0.03 |
| V2/N2 | 34.19 | f/R8 | −1.88 |
| V3/N3 | 36.26 | R7/f + R8/f | −0.80 |
| V4/N4 | 10.91 | Y42/Y11 | 1.32 |
| CT1/T12 | 0.84 | Yc11/f | 0.06 |
| CT1/CT2 | 0.54 | Yc42/f | 0.61 |
| T12/(T23 + T34) | 1.91 | — | — |

3rd Embodiment

Figure 5:
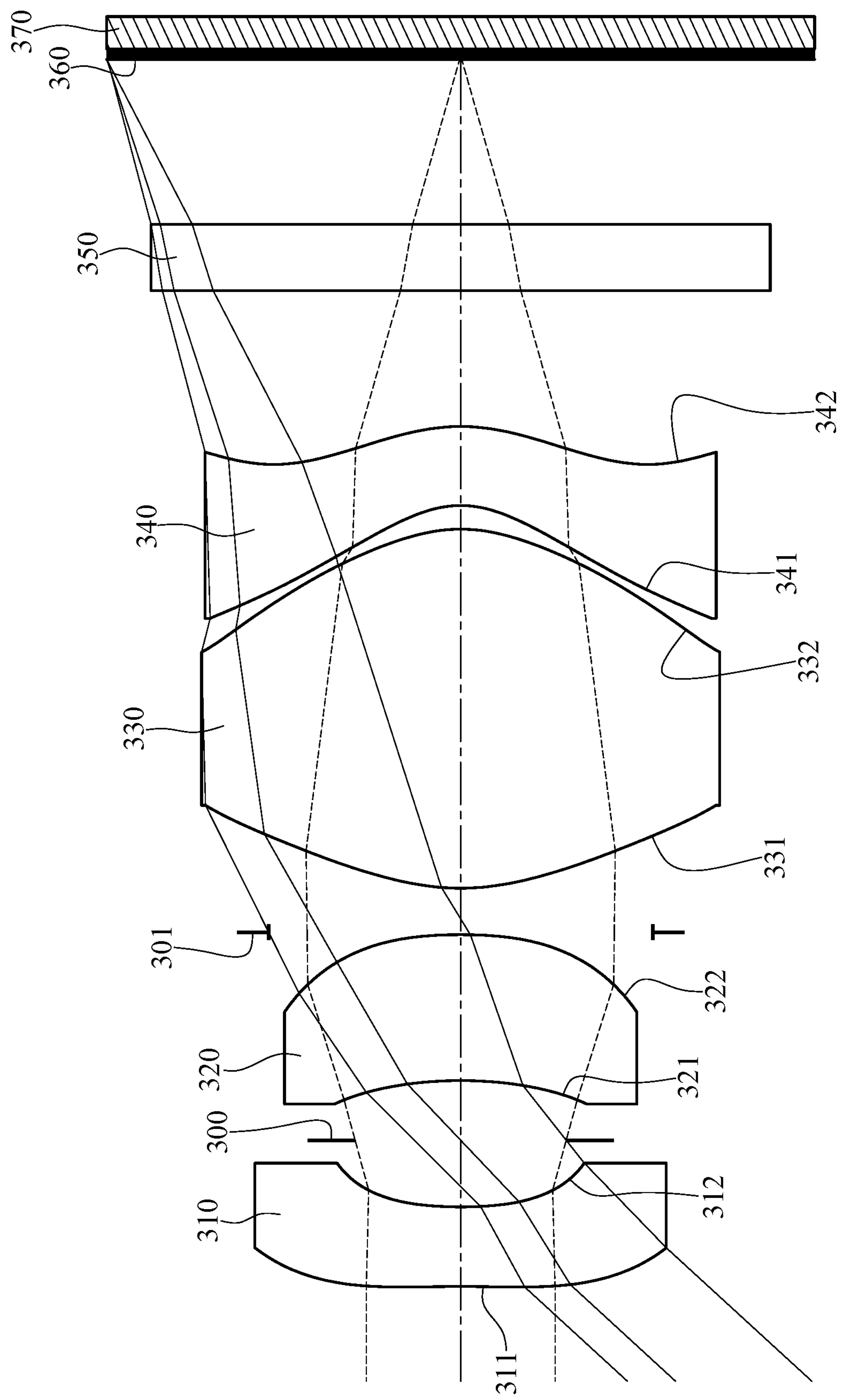
FIG. 5 is a schematic view of an optical lens assembly and an image sensor of an electronic device according to the 3rd embodiment of the present disclosure.
Figure 6:
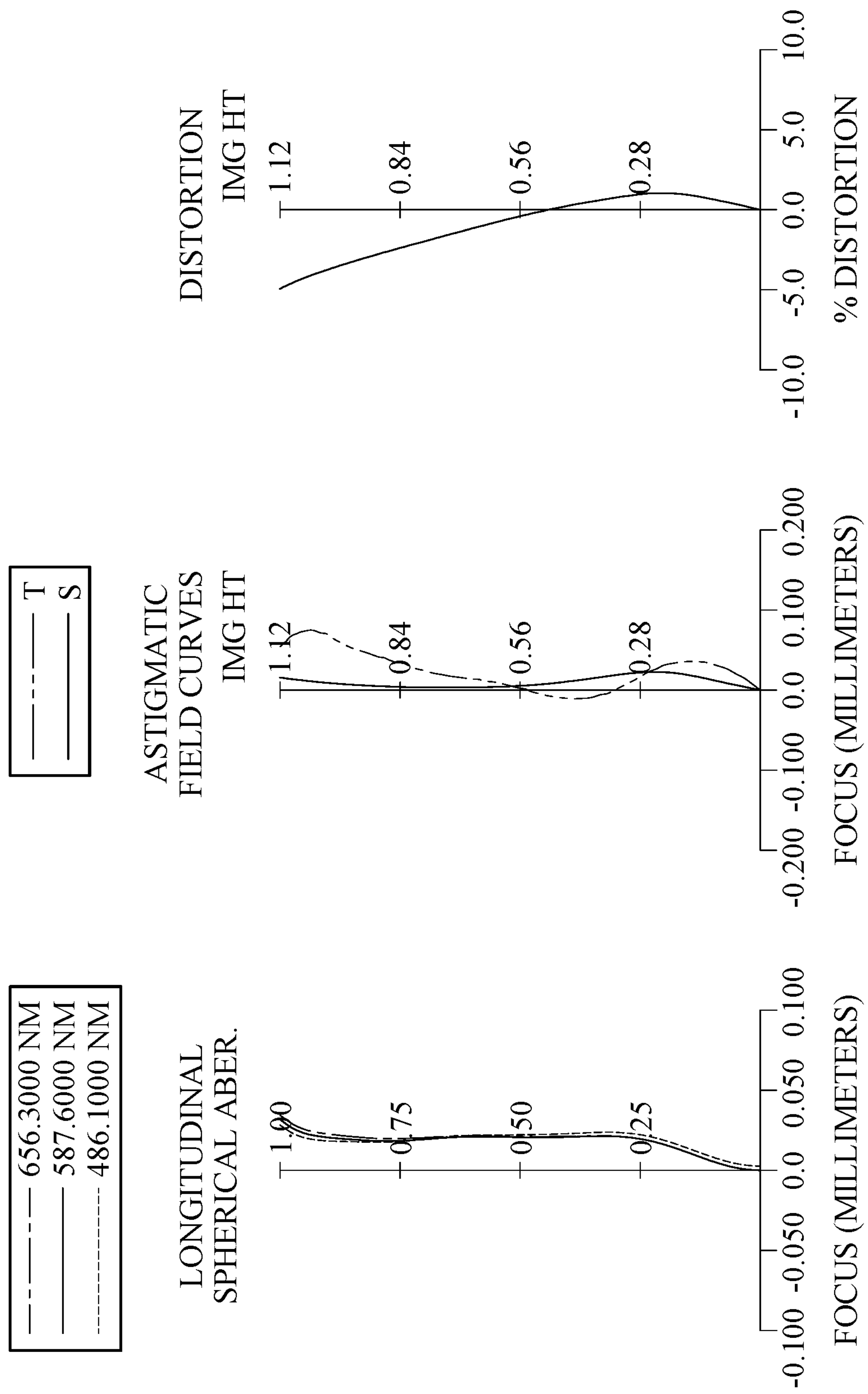
FIG. 6 shows spherical aberration curves, astigmatic field curves and a distortion curve of the optical lens assembly of the electronic device according to the 3rd embodiment.

FIG. 5 is a schematic view of an optical lens assembly and an image sensor of an electronic device according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical lens assembly (its reference numeral is omitted) of the present disclosure and an image sensor 370. The optical lens assembly includes, in order from an outer side to an inner side, a first lens element 310, an aperture stop 300, a second lens element 320, a stop 301, a third lens element 330, a fourth lens element 340, an IR-cut filter 350 and an image surface 360. The optical lens assembly includes four lens elements (310, 320, 330 and 340) with no additional lens element disposed between each of the adjacent four lens elements.

The first lens element 310 with negative refractive power has an outer-side surface 311 being concave in a paraxial region thereof and an inner-side surface 312 being concave in a paraxial region thereof. The first lens element 310 is made of plastic material and has the outer-side surface 311 and the inner-side surface 312 being both aspheric. The outer-side surface 311 of the first lens element 310 has at least one convex critical point in an off-axis region thereof.

The second lens element 320 with negative refractive power has an outer-side surface 321 being concave in a paraxial region thereof and an inner-side surface 322 being convex in a paraxial region thereof. The second lens element 320 is made of plastic material and has the outer-side surface 321 and the inner-side surface 322 being both aspheric.

The third lens element 330 with positive refractive power has an outer-side surface 331 being convex in a paraxial region thereof and an inner-side surface 332 being convex in a paraxial region thereof. The third lens element 330 is made of plastic material and has the outer-side surface 331 and the inner-side surface 332 being both aspheric.

The fourth lens element 340 with negative refractive power has an outer-side surface 341 being concave in a paraxial region thereof and an inner-side surface 342 being convex in a paraxial region thereof. The fourth lens element 340 is made of plastic material and has the outer-side surface 341 and the inner-side surface 342 being both aspheric. The inner-side surface 342 of the fourth lens element 340 has at least one concave critical point in an off-axis region thereof.

The IR-cut filter 350 is made of glass material and located between the fourth lens element 340 and the image surface 360, and will not affect the focal length of the optical lens assembly. The image sensor 370 is disposed on or near the image surface 360 of the optical lens assembly.

The detailed optical data of the 3rd embodiment are shown in Table 5 and the aspheric surface data are shown in Table 6 below.

TABLE 5

| 3rd Embodiment<br>f = 1.08 mm, Fno = 1.80, HFOV = 47.5 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Lens 1 | −4.558 (ASP) | 0.252 | Plastic | 1.544 | 55.9 | −1.86 |
| 2 | | 1.323 (ASP) | 0.211 | | | | |
| 3 | Ape. Stop | Plano | 0.189 | | | | |
| 4 | Lens 2 | −1.285 (ASP) | 0.462 | Plastic | 1.544 | 55.9 | −47.60 |
| 5 | | −1.523 (ASP) | 0.008 | | | | |
| 6 | Stop | Plano | 0.139 | | | | |
| 7 | Lens 3 | 0.734 (ASP) | 1.137 | Plastic | 1.544 | 55.9 | 0.80 |
| 8 | | −0.488 (ASP) | 0.075 | | | | |
| 9 | Lens 4 | −0.311 (ASP) | 0.250 | Plastic | 1.686 | 18.4 | −1.41 |
| 10 | | −0.609 (ASP) | 0.430 | | | | |
| 11 | IR-Cut Filter | Plano | 0.210 | Glass | 1.517 | 64.2 | — |
| 12 | | Plano | 0.522 | | | | |
| 13 | Image | Plano | 0.000 | | | | |

Note:
Reference wavelength is 587.6 nm (d-line).
An effective radius of the stop 301 (Surface 6) is 0.608 mm.

TABLE 6

| Aspheric Coefficients | | | | |
|---|---|---|---|---|
| Surface # | 1 | 2 | 4 | 5 |
| k= | 1.3620E+01 | 0.0000E+00 | 0.0000E+00 | 0.0000E+00 |
| A4= | 1.9094E+00 | 2.1577E+00 | −3.0374E−01 | −2.1792E+00 |
| A6= | −8.8997E+00 | 4.5063E+01 | 3.3218E+00 | 3.6854E+00 |
| A8= | 6.6353E+01 | −1.5347E+03 | −1.3304E+02 | 9.1385E+01 |
| A10= | −4.2811E+02 | 3.0562E+04 | 2.8676E+03 | −1.6484E+03 |
| A12= | 1 9290E+03 | −3.8177E+05 | −4.1311E+04 | 1.3509E+04 |
| A14= | −5.5627E+03 | 3.0709E+06 | 3.7402E+05 | −6.4315E+04 |
| A16= | 9.6952E+03 | −1.5281E+07 | −2.0483E+06 | 1.8081E+05 |
| A18= | −9.2168E+03 | 4.2755E+07 | 6.2177E+06 | −2.7856E+05 |
| A20= | 3.6300E+03 | −5.1128E+07 | −8.0669E+06 | 1.8131E+05 |
| Surface # | 7 | 8 | 9 | 10 |
| k= | −1.0340E+01 | −6.3167E+00 | −2.6175E+00 | −1.1672E+00 |
| A4= | 1.0209E+00 | −2.1911E+00 | 1.2995E−01 | 2.0493E+00 |
| A6= | −7.7973E+00 | 2.5205E+01 | 8.7626E+00 | −4.2529E+00 |
| A8= | 4.5118E+01 | −1.8787E+02 | −9.1224E+01 | 9.2188E+00 |
| A10= | −1.8620E+02 | 8.4945E+02 | 4.7853E+02 | −1.1944E+01 |
| A12= | 5.2096E+02 | −2.4067E+03 | −1.4862E+03 | 1.2120E+01 |
| A14= | −9.5562E+02 | 4.3212E+03 | 2.8558E+03 | −2.8694E+01 |
| A16= | 1.0953E+03 | −4.7873E+03 | −3.3608E+03 | 5.2739E+01 |
| A18= | −7.0767E+02 | 2.9903E+03 | 2.2344E+03 | −4.3331E+01 |
| A20= | 1.9605E+02 | −8.0563E+02 | −6.4575E+02 | 1.2614E+01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.08 | CT2/CT3 | 0.41 |
| Fno | 1.80 | Td/BL | 2.34 |
| HFOV [deg.] | 47.5 | (R1 + R2)/(R1 − R2) | 0.55 |
| V1/N1 | 36.23 | f/R1 | −0.24 |
| V2/N2 | 36.23 | f/R8 | −1.77 |
| V3/N3 | 36.23 | R7/f + R8/f | −0.86 |
| V4/N4 | 10.91 | Y42/Y11 | 1.24 |
| CT1/T12 | 0.63 | Yc11/f | 0.18 |
| CT1/CT2 | 0.55 | Yc42/f | 0.55 |
| T12/(T23 + T34) | 1.80 | — | — |

4th Embodiment

Figure 7:
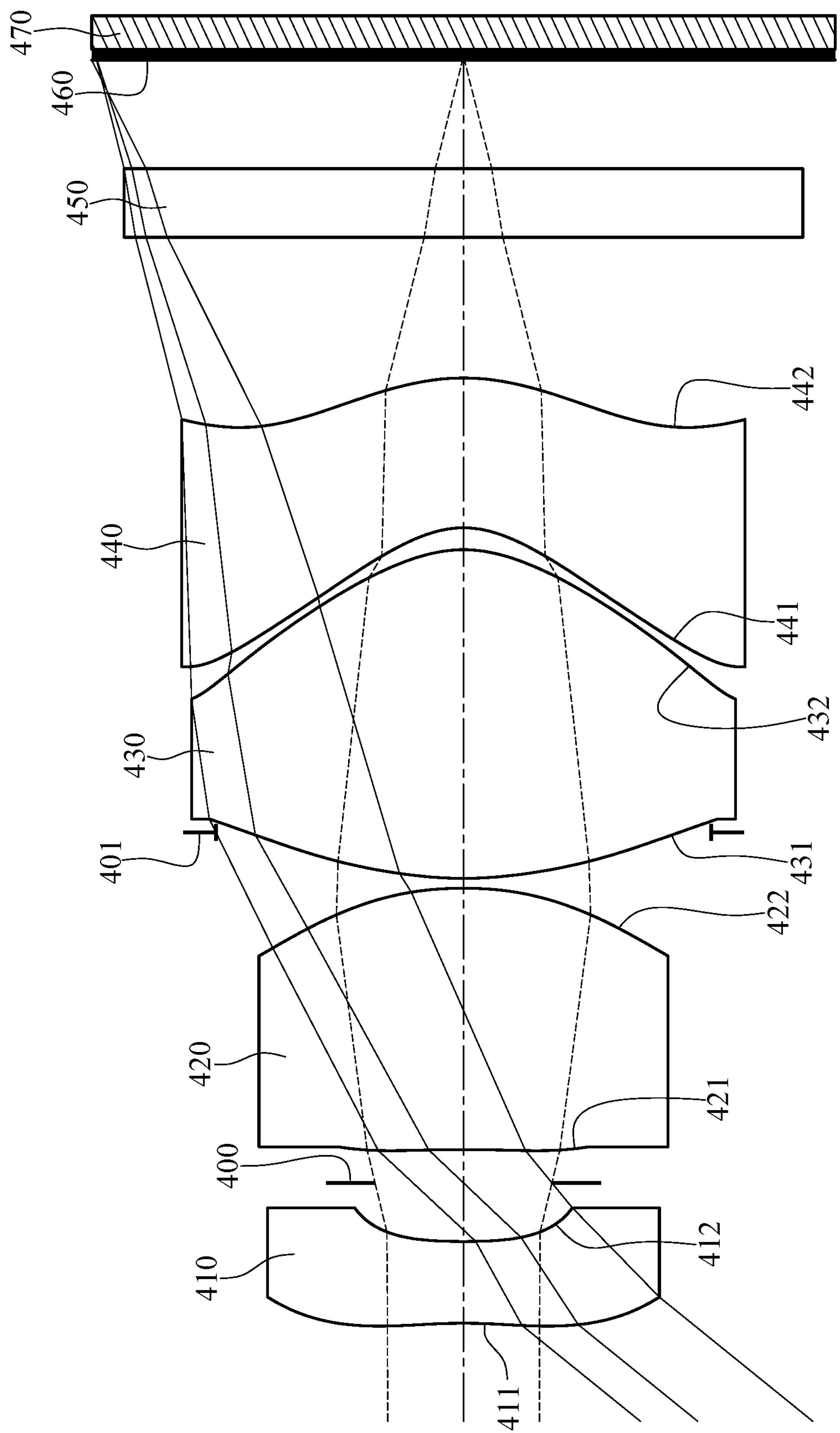
FIG. 7 is a schematic view of an optical lens assembly and an image sensor of an electronic device according to the 4th embodiment of the present disclosure.
Figure 8:
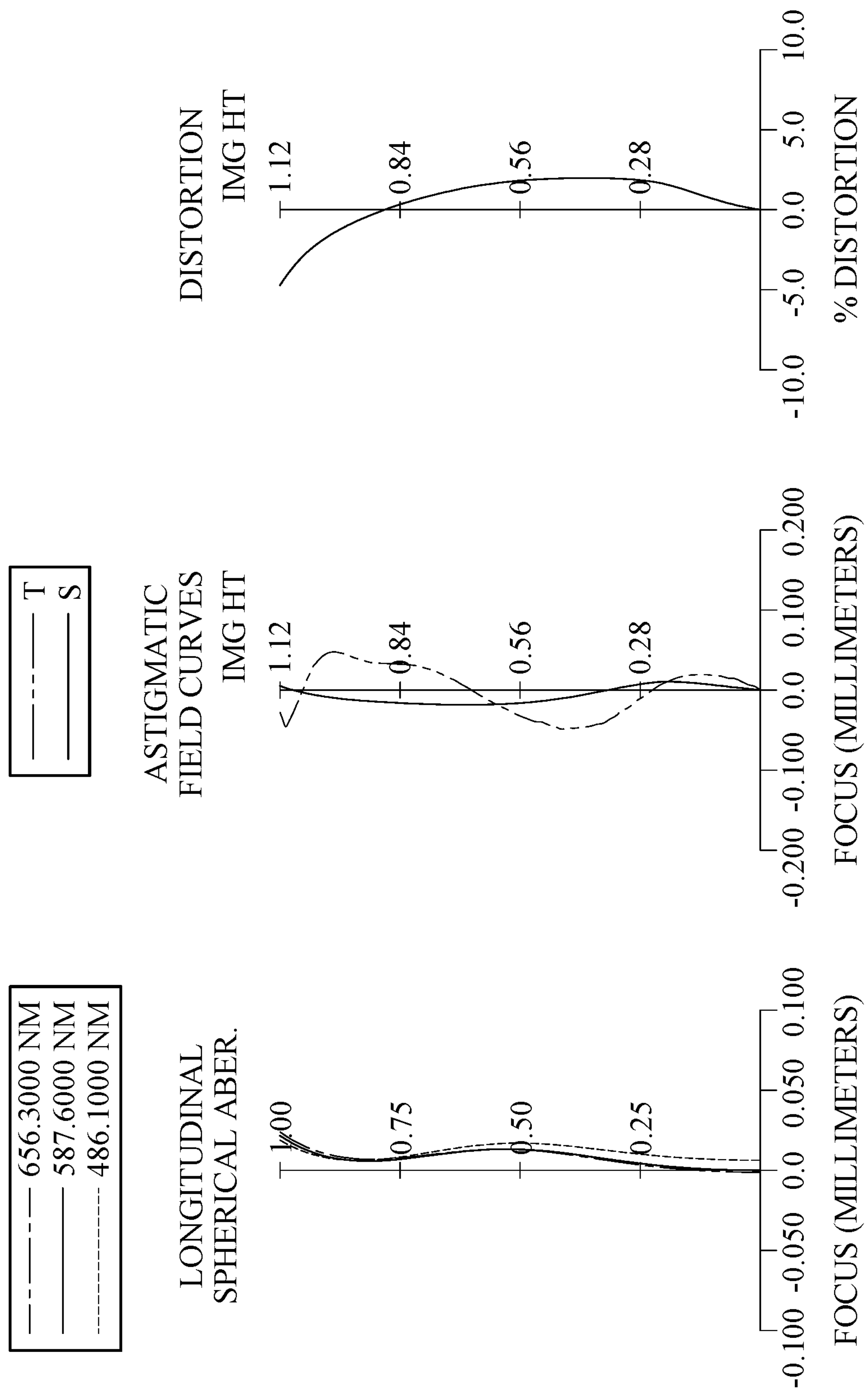
FIG. 8 shows spherical aberration curves, astigmatic field curves and a distortion curve of the optical lens assembly of the electronic device according to the 4th embodiment.

FIG. 7 is a schematic view of an optical lens assembly and an image sensor of an electronic device according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical lens assembly (its reference numeral is omitted) of the present disclosure and an image sensor 470. The optical lens assembly includes, in order from an outer side to an inner side, a first lens element 410, an aperture stop 400, a second lens element 420, a stop 401, a third lens element 430, a fourth lens element 440, an IR-cut filter 450 and an image surface 460. The optical lens assembly includes four lens elements (410, 420, 430 and 440) with no additional lens element disposed between each of the adjacent four lens elements.

The first lens element 410 with negative refractive power has an outer-side surface 411 being concave in a paraxial region thereof and an inner-side surface 412 being concave in a paraxial region thereof. The first lens element 410 is made of plastic material and has the outer-side surface 411 and the inner-side surface 412 being both aspheric. The outer-side surface 411 of the first lens element 410 has at least one convex critical point in an off-axis region thereof.

The second lens element 420 with positive refractive power has an outer-side surface 421 being concave in a paraxial region thereof and an inner-side surface 422 being convex in a paraxial region thereof. The second lens element 420 is made of plastic material and has the outer-side surface 421 and the inner-side surface 422 being both aspheric. The outer-side surface 421 of the second lens element 420 has at least one convex critical point in an off-axis region thereof.

The third lens element 430 with positive refractive power has an outer-side surface 431 being convex in a paraxial region thereof and an inner-side surface 432 being convex in a paraxial region thereof. The third lens element 430 is made of plastic material and has the outer-side surface 431 and the inner-side surface 432 being both aspheric.

The fourth lens element 440 with negative refractive power has an outer-side surface 441 being concave in a paraxial region thereof and an inner-side surface 442 being convex in a paraxial region thereof. The fourth lens element 440 is made of plastic material and has the outer-side surface 441 and the inner-side surface 442 being both aspheric. The inner-side surface 442 of the fourth lens element 440 has at least one concave critical point in an off-axis region thereof.

The IR-cut filter 450 is made of glass material and located between the fourth lens element 440 and the image surface 460, and will not affect the focal length of the optical lens assembly. The image sensor 470 is disposed on or near the image surface 460 of the optical lens assembly.

The detailed optical data of the 4th embodiment are shown in Table 7 and the aspheric surface data are shown in Table 8 below.

TABLE 7

| 4th Embodiment f = 0.95 mm, Fno = 2.04, HFOV = 51.0 deg. | | | | | | | |
|---|---|---|---|---|---|---|---|
| Surface # | | Curvature Radius | Thickness | Material | Index | Abbe # | Focal Length |
| 0 | Object | Plano | 400.000 | | | | |
| 1 | Lens 1 | −1.604 (ASP) | 0.250 | Plastic | 1.545 | 56.1 | −1.60 |
| 2 | | 2.023 (ASP) | 0.179 | | | | |
| 3 | Ape. Stop | Plano | 0.102 | | | | |
| 4 | Lens 2 | −3.997 (ASP) | 0.799 | Plastic | 1.544 | 56.0 | 2.63 |
| 5 | | −1.127 (ASP) | 0.171 | | | | |
| 6 | Stop | Plano | −0.141 | | | | |
| 7 | Lens 3 | 1.132 (ASP) | 1.005 | Plastic | 1.544 | 56.0 | 0.70 |
| 8 | | −0.396 (ASP) | 0.067 | | | | |
| 9 | Lens 4 | −0.293 (ASP) | 0.458 | Plastic | 1.669 | 19.4 | −1.50 |
| 10 | | −0.673 (ASP) | 0.430 | | | | |
| 11 | IR-Cut Filter | Plano | 0.210 | Glass | 1.517 | 64.2 | — |
| 12 | | Plano | 0.332 | | | | |
| 13 | Image | Plano | 0.000 | | | | |

Note:
Reference wavelength is 587.6 nm (d-line).
An effective radius of the stop 401 (Surface 6) is 0.757 mm.

TABLE 8

| Aspheric Coefficients | | | | |
|---|---|---|---|---|
| Surface # | 1 | 2 | 4 | 5 |
| k= | −7.2036E+01 | 0.0000E+00 | 0.0000E+00 | 0.0000E+00 |
| A4= | 1.6660E+00 | 3.3538E+00 | 8.9410E−01 | −1.5952E+00 |
| A6= | −2.6705E+00 | 1.7269E+02 | 7.9603E+00 | 1.3025E+01 |
| A8= | −3.2417E+00 | −7.2854E+03 | −5.2243E+01 | −5.7998E+01 |
| A10= | 4.2689E+01 | 1.6674E+05 | 9.8370E+01 | 1.4802E+02 |
| A12= | −1.0578E+02 | −2.2047E+06 | — | −1.9252E+02 |
| A14= | 8.6563E+01 | 1.6813E+07 | — | 9.9050E+01 |
| A16= | — | −6.6944E+07 | — | — |
| A18= | — | 1.0553E+08 | — | — |
| Surface # | 7 | 8 | 9 | 10 |
| k= | −2.5796E+01 | −3.3947E+00 | −2.3994E+00 | −9.1149E−01 |
| A4= | 2.7747E−01 | 1.8644E−01 | 6.8011E−01 | 1.2383E+00 |
| A6= | 2.4967E+00 | −8.6527E+00 | −9.6345E+00 | −8.5001E−01 |
| A8= | −2.0586E+01 | 6.4430E+01 | 7.7312E+01 | −4.2918E+00 |
| A10= | 7.9577E+01 | −2.4710E+02 | −3.3227E+02 | 4.2061E+01 |
| A12= | −1.8745E+02 | 5.4857E+02 | 8.4410E+02 | −1.5868E+02 |
| A14= | 2.6518E+02 | −7.1202E+02 | −1.3147E+03 | 3.2621E+02 |
| A16= | −2.0454E+02 | 5.0230E+02 | 1.2366E+03 | −3.8418E+02 |
| A18= | 6.5779E+01 | −1.4812E+02 | −6.4368E+02 | 2.4303E+02 |
| A20= | — | — | 1.4181E+02 | −6.3874E+01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.95 | CT2/CT3 | 0.80 |
| Fno | 2.04 | Td/BL | 2.97 |
| HFOV [deg.] | 51.0 | (R1 + R2)/(R1 − R2) | −0.12 |
| V1/N1 | 36.30 | f/R1 | −0.59 |

-continued

| 4th Embodiment | | | |
|---|---|---|---|
| V2/N2 | 36.26 | f/R8 | −1.41 |
| V3/N3 | 36.26 | R7/f + R8/f | −1.02 |
| V4/N4 | 11.65 | Y42/Y11 | 1.44 |
| CT1/T12 | 0.89 | Yc11/f | 0.27 |
| CT1/CT2 | 0.31 | Yc42/f | 0.72 |
| T12/(T23 + T34) | 2.90 | — | — |

5th Embodiment

Figure 9:
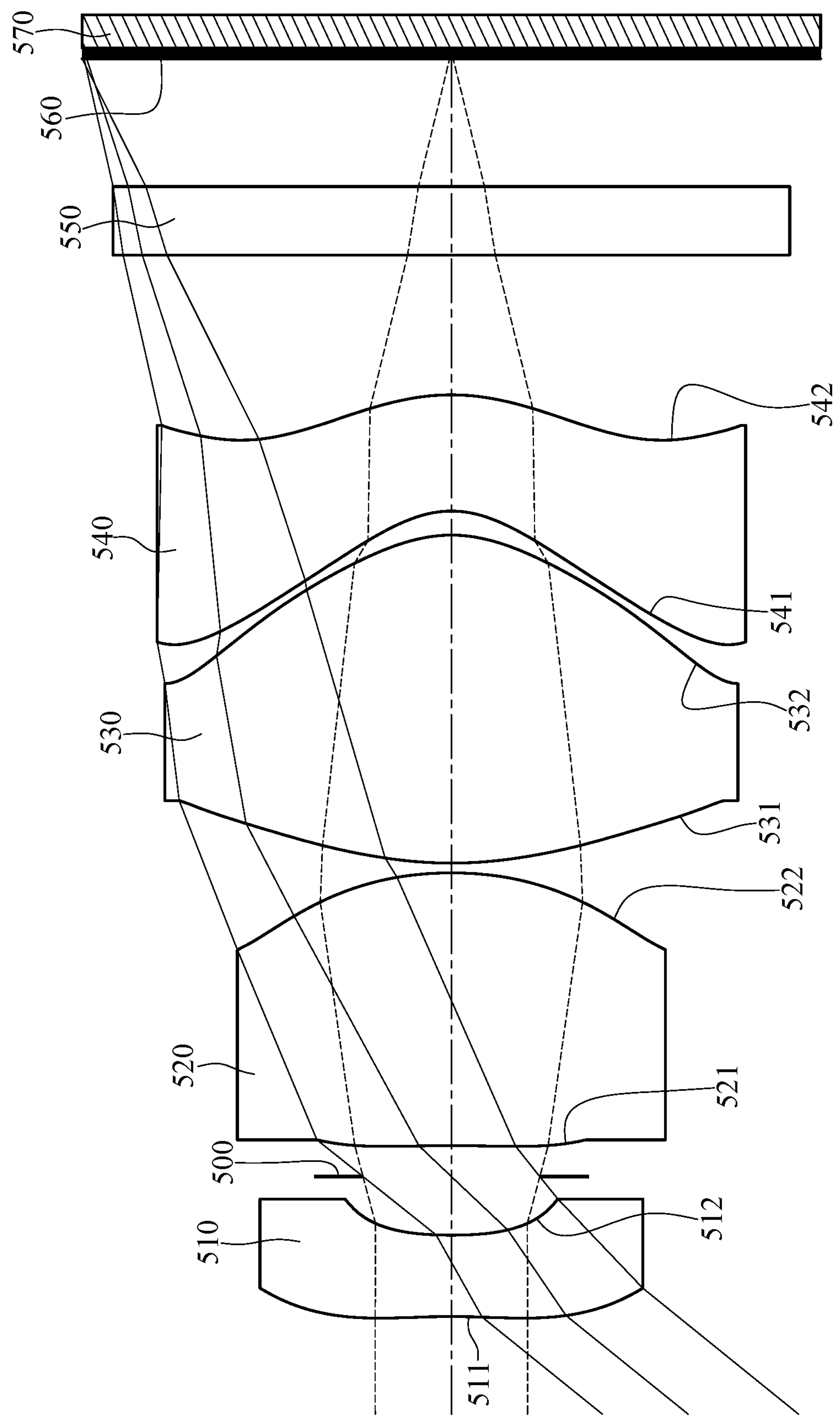
FIG. 9 is a schematic view of an optical lens assembly and an image sensor of an electronic device according to the 5th embodiment of the present disclosure.
Figure 10:
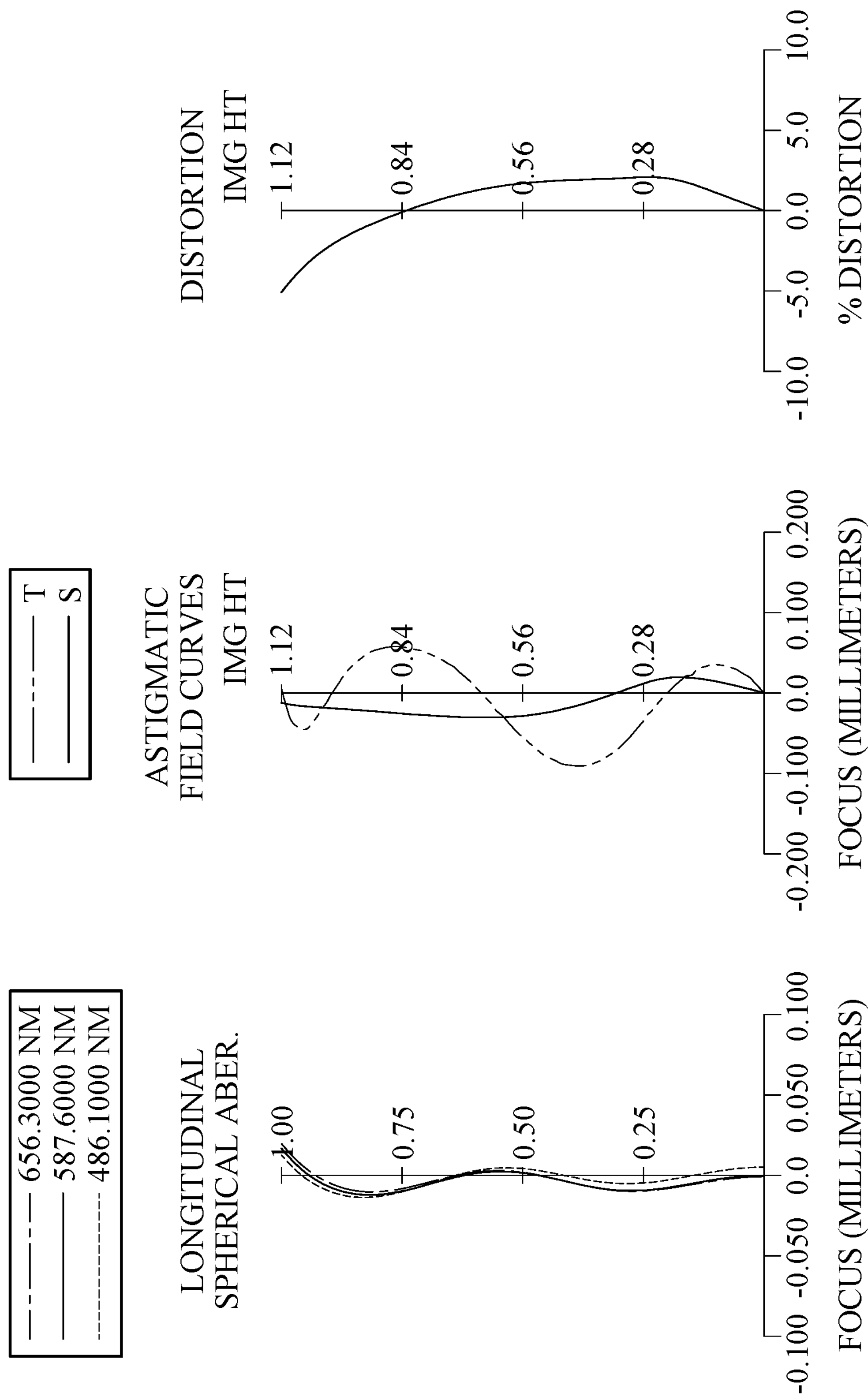
FIG. 10 shows spherical aberration curves, astigmatic field curves and a distortion curve of the optical lens assembly of the electronic device according to the 5th embodiment.

FIG. 9 is a schematic view of an optical lens assembly and an image sensor of an electronic device according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical lens assembly (its reference numeral is omitted) of the present disclosure and an image sensor 570. The optical lens assembly includes, in order from an outer side to an inner side, a first lens element 510, an aperture stop 500, a second lens element 520, a third lens element 530, a fourth lens element 540, an IR-cut filter 550 and an image surface 560. The optical lens assembly includes four lens elements (510, 520, 530 and 540) with no additional lens element disposed between each of the adjacent four lens elements.

The first lens element 510 with negative refractive power has an outer-side surface 511 being concave in a paraxial region thereof and an inner-side surface 512 being concave in a paraxial region thereof. The first lens element 510 is made of plastic material and has the outer-side surface 511 and the inner-side surface 512 being both aspheric. The outer-side surface 511 of the first lens element 510 has at least one convex critical point in an off-axis region thereof.

The second lens element 520 with positive refractive power has an outer-side surface 521 being concave in a paraxial region thereof and an inner-side surface 522 being convex in a paraxial region thereof. The second lens element 520 is made of plastic material and has the outer-side surface 521 and the inner-side surface 522 being both aspheric. The outer-side surface 521 of the second lens element 520 has at least one convex critical point in an off-axis region thereof.

The third lens element 530 with positive refractive power has an outer-side surface 531 being convex in a paraxial region thereof and an inner-side surface 532 being convex in a paraxial region thereof. The third lens element 530 is made of plastic material and has the outer-side surface 531 and the inner-side surface 532 being both aspheric.

The fourth lens element 540 with negative refractive power has an outer-side surface 541 being concave in a paraxial region thereof and an inner-side surface 542 being convex in a paraxial region thereof. The fourth lens element 540 is made of plastic material and has the outer-side surface 541 and the inner-side surface 542 being both aspheric. The inner-side surface 542 of the fourth lens element 540 has at least one concave critical point in an off-axis region thereof.

The IR-cut filter 550 is made of glass material and located between the fourth lens element 540 and the image surface 560, and will not affect the focal length of the optical lens assembly. The image sensor 570 is disposed on or near the image surface 560 of the optical lens assembly.

The detailed optical data of the 5th embodiment are shown in Table 9 and the aspheric surface data are shown in Table 10 below.

TABLE 9

| 5th Embodiment<br>f = 0.96 mm, Fno = 2.04, HFOV = 51.0 deg. | | | | | | | | |
|---|---|---|---|---|---|---|---|---|
| Surface # | | Curvature Radius | | Thickness | Material | Index | Abbe # | Focal Length |
| 0 | Object | Plano | | 400.000 | | | | |
| 1 | Lens 1 | −2.172 | (ASP) | 0.250 | Plastic | 1.545 | 56.1 | −1.40 |
| 2 | | 1.221 | (ASP) | 0.180 | | | | |
| 3 | Ape. Stop | Plano | | 0.095 | | | | |
| 4 | Lens 2 | −5.281 | (ASP) | 0.838 | Plastic | 1.544 | 56.0 | 2.35 |
| 5 | | −1.088 | (ASP) | 0.030 | | | | |
| 6 | Lens 3 | 1.200 | (ASP) | 1.008 | Plastic | 1.544 | 56.0 | 0.73 |
| 7 | | −0.421 | (ASP) | 0.074 | | | | |
| 8 | Lens 4 | −0.300 | (ASP) | 0.357 | Plastic | 1.669 | 19.4 | −1.32 |
| 9 | | −0.673 | (ASP) | 0.430 | | | | |
| 10 | IR-Cut Filter | Plano | | 0.210 | Glass | 1.517 | 64.2 | — |
| 11 | | Plano | | 0.393 | | | | |
| 12 | Image | Plano | | 0.000 | | | | |

Note:
Reference wavelength is 587.6 nm (d-line).

TABLE 10

| Aspheric Coefficients | | | | |
|---|---|---|---|---|
| Surface # | 1 | 2 | 4 | 5 |
| k= | −9.9000E+01 | 0.0000E+00 | 0.0000E+00 | 0.0000E+00 |
| A4= | 2.2278E+00 | −1.5614E+00 | 7.4140E−01 | −1.0120E+00 |
| A6= | −1.1346E+01 | 5.5269E+02 | 7.7492E+00 | 6.2422E+00 |
| A8= | 7.7001E+01 | −2.3588E+04 | −4.2029E+01 | −2.6803E+01 |
| A10= | −3.9937E+02 | 5.7614E+05 | 6.6424E+01 | 6.8645E+01 |
| A12= | 1.2899E+03 | −8.3080E+06 | — | −8.2300E+01 |
| A14= | −2.2300E+03 | 6.9689E+07 | — | 3.7724E+01 |
| A16= | 1.5540E+03 | −3.1086E+08 | — | — |
| A18= | — | 5.6452E+08 | — | — |
| Surface # | 6 | 7 | 8 | 9 |
| k= | −3.2236E+01 | −4.7117E+00 | −2.4259E+00 | −9.1682E−01 |
| A4= | 9.2499E−01 | −2.0957E+00 | −8.1548E−01 | 1.1386E+00 |
| A6= | −4.6914E+00 | 1.7385E+01 | 1.2564E+01 | −2.2953E−01 |

TABLE 10-continued

| Aspheric Coefficients | | | | |
|---|---|---|---|---|
| A8= | 2.0332E+01 | −8.4218E+01 | −6.5207E+01 | 1.6635E+00 |
| A10= | −6.8215E+01 | 2.3425E+02 | 1.7802E+02 | −1.4043E+01 |
| A12= | 1.5016E+02 | −3.8508E+02 | −2.6508E+02 | 4.4274E+01 |
| A14= | −2.0122E+02 | 3.6794E+02 | 1.8932E+02 | −7.1367E+01 |
| A16= | 1.5121E+02 | −1.8574E+02 | −1.1204E+01 | 5.7783E+01 |
| A18= | −4.9470E+01 | 3.7484E+01 | −6.3391E+01 | −1.9066E+01 |
| A20= | — | — | 2.6103E+01 | 5.5543E−01 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.96 | CT2/CT3 | 0.83 |
| Fno | 2.04 | Td/BL | 2.74 |
| HFOV [deg.] | 51.0 | (R1 + R2)/(R1 − R2) | 0.28 |
| V1/N1 | 36.30 | f/R1 | −0.44 |
| V2/N2 | 36.26 | f/R8 | −1.42 |
| V3/N3 | 36.26 | R7/f + R8/f | −1.02 |
| V4/N4 | 11.65 | Y42/Y11 | 1.51 |
| CT1/T12 | 0.91 | Yc11/f | 0.23 |
| CT1/CT2 | 0.30 | Yc42/f | 0.68 |
| T12/(T23 + T34) | 2.64 | — | — |

6th Embodiment

Figure 11:
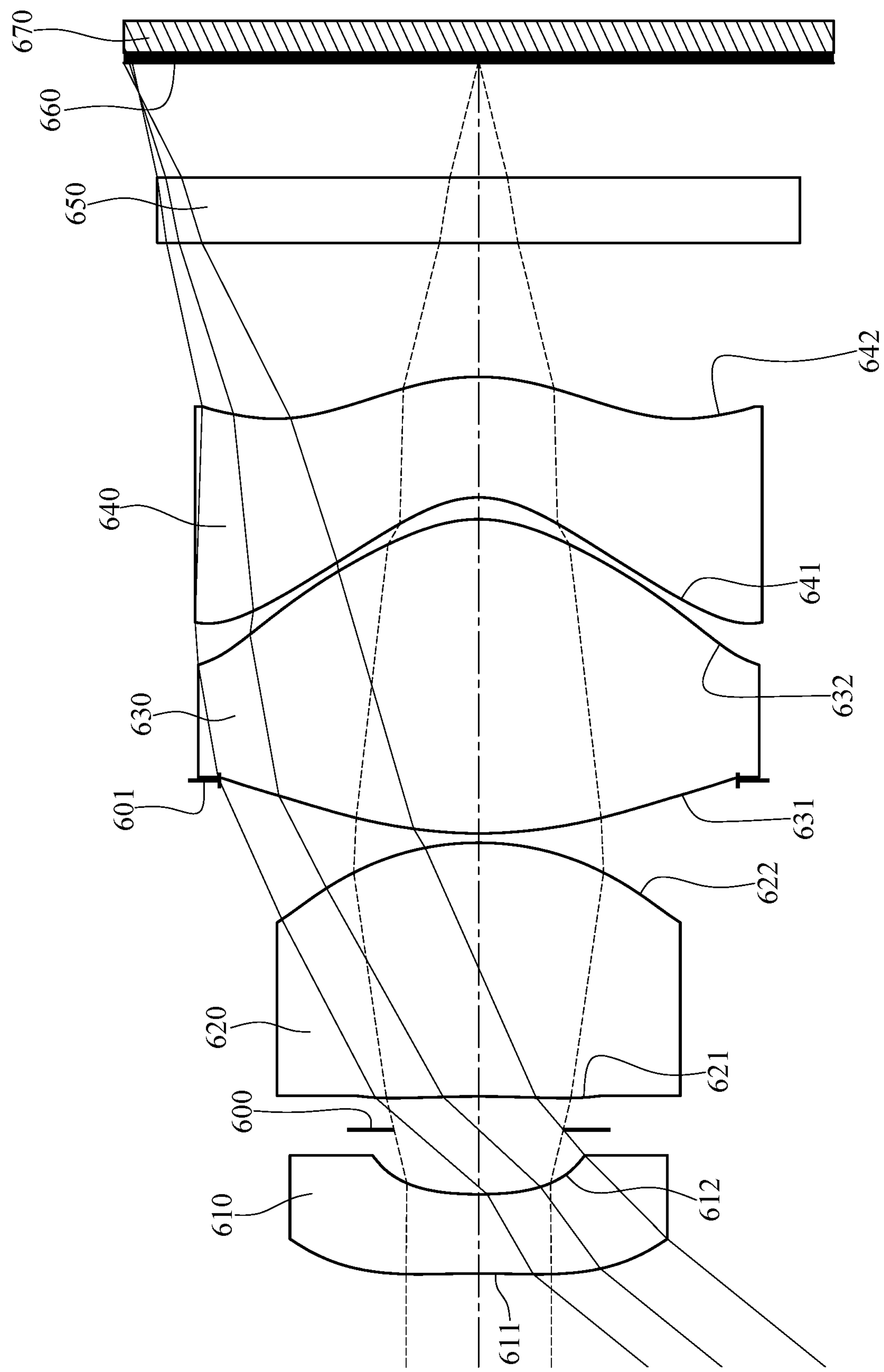
FIG. 11 is a schematic view of an optical lens assembly and an image sensor of an electronic device according to the 6th embodiment of the present disclosure.
Figure 12:
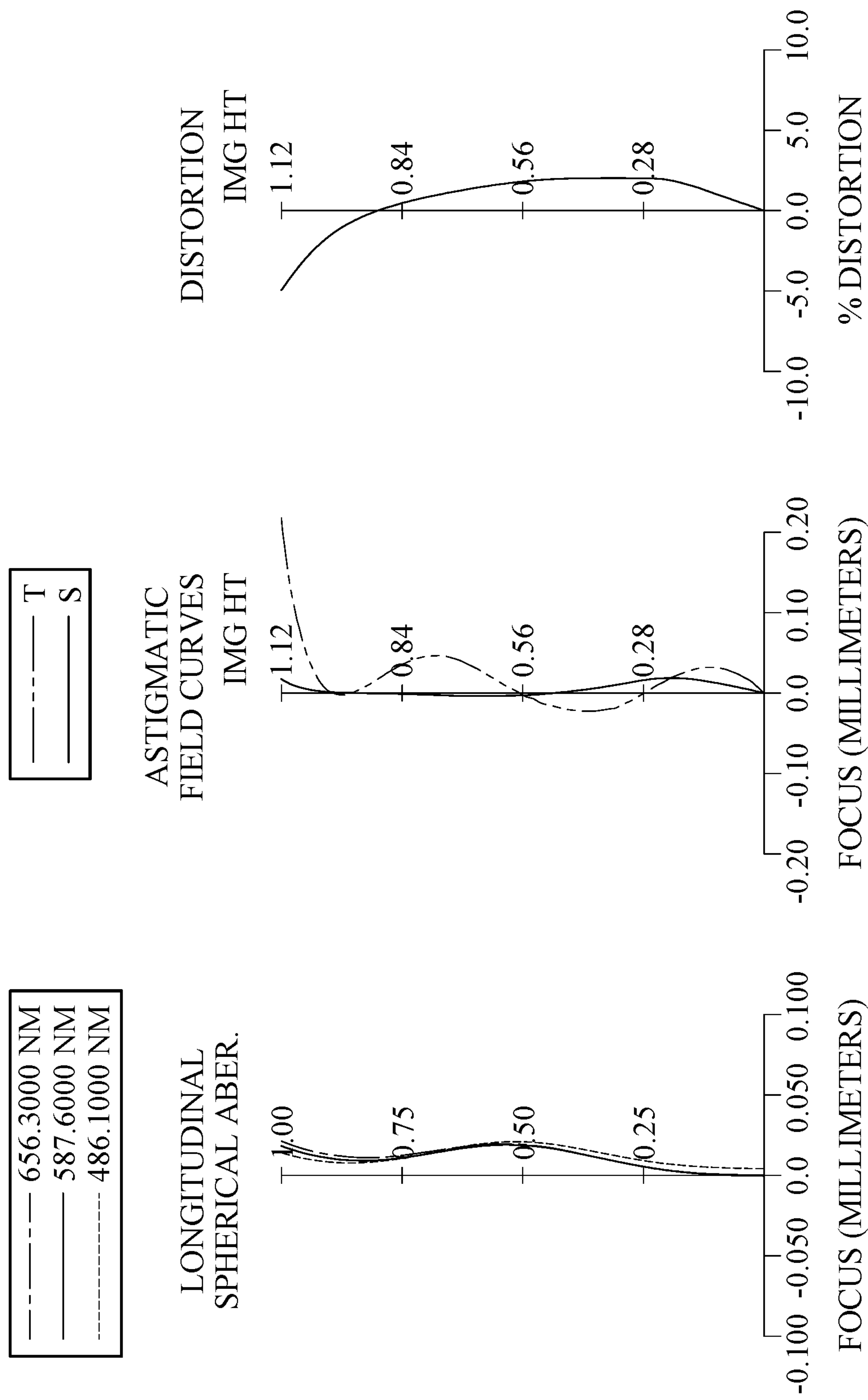
FIG. 12 shows spherical aberration curves, astigmatic field curves and a distortion curve of the optical lens assembly of the electronic device according to the 6th embodiment.

FIG. 11 is a schematic view of an optical lens assembly and an image sensor of an electronic device according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical lens assembly (its reference numeral is omitted) of the present disclosure and an image sensor 670. The optical lens assembly includes, in order from an outer side to an inner side, a first lens element 610, an aperture stop 600, a second lens element 620, a stop 601, a third lens element 630, a fourth lens element 640, an IR-cut filter 650 and an image surface 660. The optical lens assembly includes four lens elements (610, 620, 630 and 640) with no additional lens element disposed between each of the adjacent four lens elements.

The first lens element 610 with negative refractive power has an outer-side surface 611 being concave in a paraxial region thereof and an inner-side surface 612 being concave in a paraxial region thereof. The first lens element 610 is made of plastic material and has the outer-side surface 611 and the inner-side surface 612 being both aspheric. The outer-side surface 611 of the first lens element 610 has at least one convex critical point in an off-axis region thereof.

The second lens element 620 with positive refractive power has an outer-side surface 621 being concave in a paraxial region thereof and an inner-side surface 622 being convex in a paraxial region thereof. The second lens element 620 is made of plastic material and has the outer-side surface 621 and the inner-side surface 622 being both aspheric. The outer-side surface 621 of the second lens element 620 has at least one convex critical point in an off-axis region thereof.

The third lens element 630 with positive refractive power has an outer-side surface 631 being convex in a paraxial region thereof and an inner-side surface 632 being convex in a paraxial region thereof. The third lens element 630 is made of plastic material and has the outer-side surface 631 and the inner-side surface 632 being both aspheric.

The fourth lens element 640 with negative refractive power has an outer-side surface 641 being concave in a paraxial region thereof and an inner-side surface 642 being convex in a paraxial region thereof. The fourth lens element 640 is made of plastic material and has the outer-side surface 641 and the inner-side surface 642 being both aspheric. The inner-side surface 642 of the fourth lens element 640 has at least one concave critical point in an off-axis region thereof.

The IR-cut filter 650 is made of glass material and located between the fourth lens element 640 and the image surface 660, and will not affect the focal length of the optical lens assembly. The image sensor 670 is disposed on or near the image surface 660 of the optical lens assembly.

The detailed optical data of the 6th embodiment are shown in Table 11 and the aspheric surface data are shown in Table 12 below.

TABLE 11

| 6th Embodiment<br>f = 0.95 mm, Fno = 2.04, HFOV = 51.0 deg. | | | | | | | |
|---|---|---|---|---|---|---|---|
| Surface # | | Curvature Radius | Thickness | Material | Index | Abbe # | Focal Length |
| 0 | Object | Plano | 400.000 | | | | |
| 1 | Lens 1 | −3.007 (ASP) | 0.254 | Plastic | 1.545 | 56.1 | −1.52 |
| 2 | | 1.179 (ASP) | 0.207 | | | | |
| 3 | Ape. Stop | Plano | 0.107 | | | | |
| 4 | Lens 2 | −3.655 (ASP) | 0.814 | Plastic | 1.544 | 56.0 | 2.07 |
| 5 | | −0.927 (ASP) | 0.200 | | | | |

TABLE 11-continued

| 6th Embodiment f = 0.95 mm, Fno = 2.04, HFOV = 51.0 deg. | | | | | | | |
|---|---|---|---|---|---|---|---|
| Surface # | | Curvature Radius | Thickness | Material | Index | Abbe # | Focal Length |
| 6 | Stop | Plano | −0.170 | | | | |
| 7 | Lens 3 | 1.396 (ASP) | 1.008 | Plastic | 1.544 | 56.0 | 0.76 |
| 8 | | −0.435 (ASP) | 0.070 | | | | |
| 9 | Lens 4 | −0.316 (ASP) | 0.387 | Plastic | 1.669 | 19.4 | −1.43 |
| 10 | | −0.704 (ASP) | 0.430 | | | | |
| 11 | IR-Cut Filter | Plano | 0.210 | Glass | 1.517 | 64.2 | — |
| 12 | | Plano | 0.367 | | | | |
| 13 | Image | Plano | 0.000 | | | | |

Note:
Reference wavelength is 587.6 nm (d-line).
An effective radius of the stop 601 (Surface 6) is 0.831 mm.

TABLE 12

| Aspheric Coefficients | | | | |
|---|---|---|---|---|
| Surface # | 1 | 2 | 4 | 5 |
| k= | −1.1705E+00 | 0.0000E+00 | 0.0000E+00 | 0.0000E+00 |
| A4= | 2.9678E+00 | 2.6156E+00 | 7.3589E−01 | −6.3194E−01 |
| A6= | −1.6485E+01 | 2.0574E+02 | 1.9551E+00 | 5.1275E+00 |
| A8= | 1.0267E+02 | −9.6418E+03 | 2.3081E+00 | −2.1236E+01 |
| A10= | −4.6809E+02 | 2.4694E+05 | −3.1195E+01 | 4.3079E+01 |
| A12= | 1.3561E+03 | −3.6417E+06 | — | −3.1132E+01 |
| A14= | −2.1581E+03 | 3.0824E+07 | — | 3.0159E+00 |
| A16= | 1.4061E+03 | −1.3702E+08 | — | — |
| A18= | — | 2.4485E+08 | — | — |
| Surface # | 7 | 8 | 9 | 10 |
| k= | −3.0211E+01 | −4.9961E+00 | −2.4349E+00 | −8.6964E−01 |
| A4= | 5.3831E−01 | −2.1406E+00 | −3.4146E−01 | 1.1171E+00 |
| A6= | 3.5417E−01 | 1.7583E+01 | 7.8338E+00 | 3.3040E−01 |
| A8= | −1.1617E+01 | −8.4809E+01 | −4.2327E+01 | −6.0965E+00 |
| A10= | 5.3037E+01 | 2.3971E+02 | 1.1589E+02 | 2.7017E+01 |
| A12= | −1.3450E+02 | −4.0758E+02 | −1.6913E+02 | −7.4845E+01 |
| A14= | 1.9797E+02 | 4.0817E+02 | 1.1183E+02 | 1.3663E+02 |
| A16= | −1.5340E+02 | −2.1862E+02 | 8.6334E+00 | −1.5964E+02 |
| A18= | 4.7583E+01 | 4.7429E+01 | −5.1793E+01 | 1.0556E+02 |
| A20= | — | — | 1.9667E+01 | −2.9331E+01 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.95 | CT2/CT3 | 0.81 |
| Fno | 2.04 | Td/BL | 2.86 |
| HFOV [deg.] | 51.0 | (R1 + R2)/(R1 − R2) | 0.44 |
| V1/N1 | 36.30 | f/R1 | −0.32 |
| V2/N2 | 36.26 | f/R8 | −1.35 |
| V3/N3 | 36.26 | R7/f + R8/f | −1.07 |
| V4/N4 | 11.65 | Y42/Y11 | 1.46 |
| CT1/T12 | 0.81 | Yc11/f | 0.20 |
| CT1/CT2 | 0.31 | Yc42/f | 0.69 |
| T12/(T23 + T34) | 3.14 | — | — |

7th Embodiment

Figure 13:
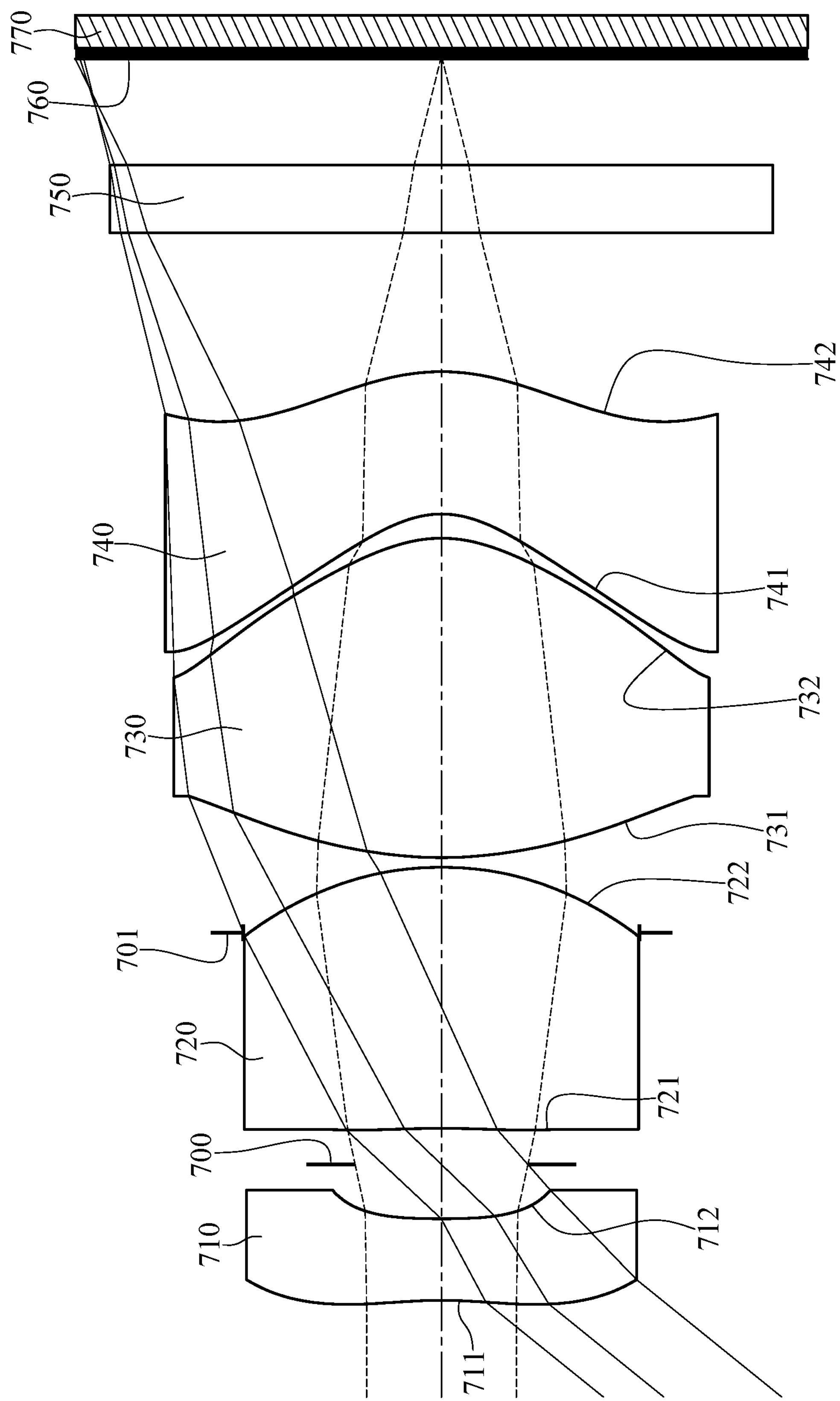
FIG. 13 is a schematic view of an optical lens assembly and an image sensor of an electronic device according to the 7th embodiment of the present disclosure.
Figure 14:
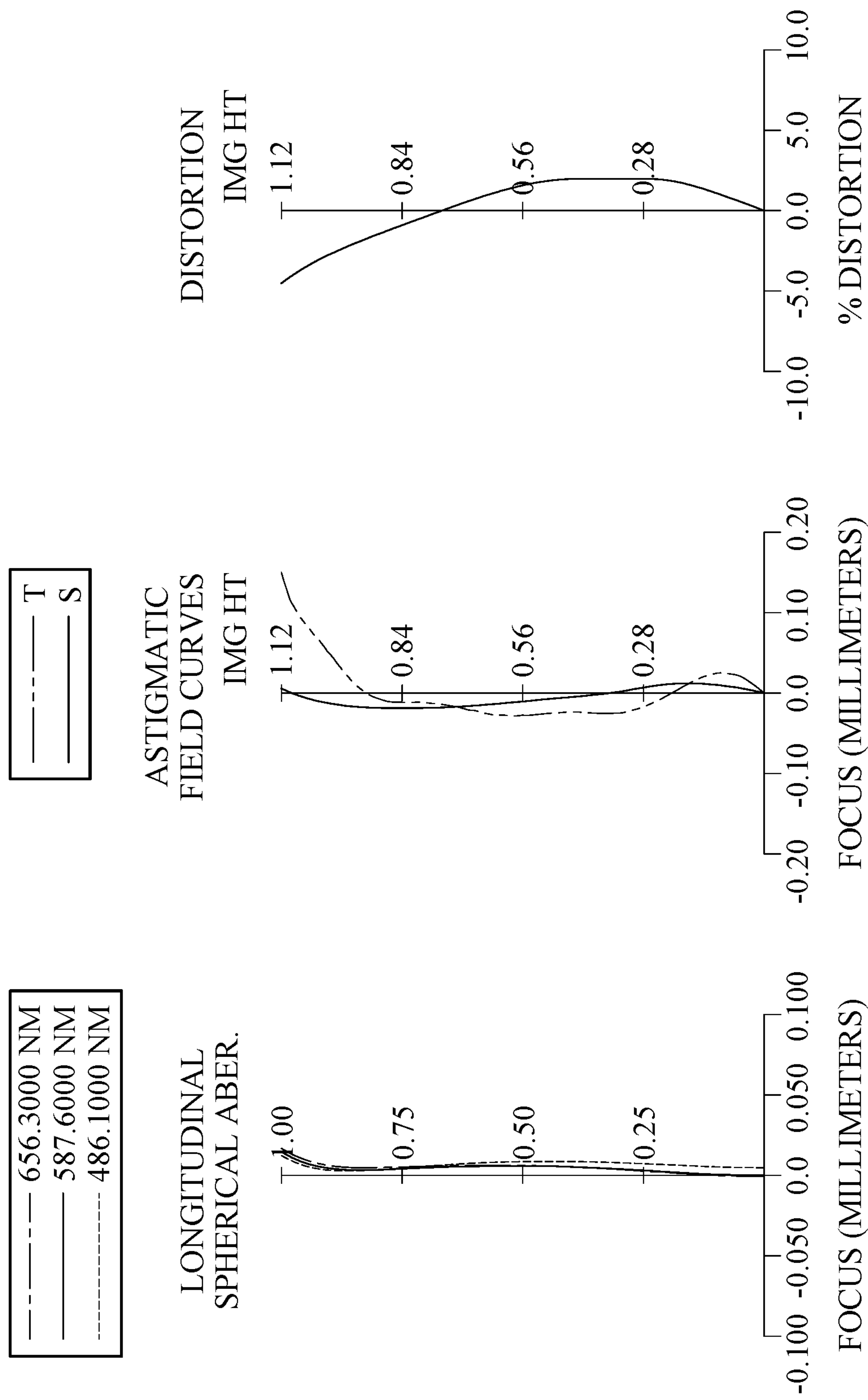
FIG. 14 shows spherical aberration curves, astigmatic field curves and a distortion curve of the optical lens assembly of the electronic device according to the 7th embodiment.

FIG. 13 is a schematic view of an optical lens assembly and an image sensor of an electronic device according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical lens assembly (its reference numeral is omitted) of the present disclosure and an image sensor 770. The optical lens assembly includes, in order from an outer side to an inner side, a first lens element 710, an aperture stop 700, a second lens element 720, a stop 701, a third lens element 730, a fourth lens element 740, an IR-cut filter 750 and an image surface 760. The optical lens assembly includes four lens elements (710, 720, 730 and 740) with no additional lens element disposed between each of the adjacent four lens elements.

The first lens element 710 with negative refractive power has an outer-side surface 711 being concave in a paraxial region thereof and an inner-side surface 712 being concave in a paraxial region thereof. The first lens element 710 is made of plastic material and has the outer-side surface 711 and the inner-side surface 712 being both aspheric. The outer-side surface 711 of the first lens element 710 has at least one convex critical point in an off-axis region thereof.

The second lens element 720 with positive refractive power has an outer-side surface 721 being concave in a paraxial region thereof and an inner-side surface 722 being convex in a paraxial region thereof. The second lens element 720 is made of plastic material and has the outer-side surface 721 and the inner-side surface 722 being both aspheric. The outer-side surface 721 of the second lens element 720 has at least one convex critical point in an off-axis region thereof.

The third lens element 730 with positive refractive power has an outer-side surface 731 being convex in a paraxial region thereof and an inner-side surface 732 being convex in a paraxial region thereof. The third lens element 730 is made of plastic material and has the outer-side surface 731 and the inner-side surface 732 being both aspheric.

The fourth lens element 740 with negative refractive power has an outer-side surface 741 being concave in a paraxial region thereof and an inner-side surface 742 being convex in a paraxial region thereof. The fourth lens element 740 is made of plastic material and has the outer-side surface 741 and the inner-side surface 742 being both aspheric. The inner-side surface 742 of the fourth lens element 740 has at least one concave critical point in an off-axis region thereof.

The IR-cut filter 750 is made of glass material and located between the fourth lens element 740 and the image surface 760, and will not affect the focal length of the optical lens assembly. The image sensor 770 is disposed on or near the image surface 760 of the optical lens assembly.

The detailed optical data of the 7th embodiment are shown in Table 13 and the aspheric surface data are shown in Table 14 below.

TABLE 13

| 7th Embodiment<br>f = 0.95 mm, Fno = 2.04, HFOV = 51.0 deg. | | | | | | | | |
|---|---|---|---|---|---|---|---|---|
| Surface # | | Curvature Radius | | Thickness | Material | Index | Abbe # | Focal Length |
| 0 | Object | Plano | | 400.000 | | | | |
| 1 | Lens 1 | −1.395 | (ASP) | 0.253 | Plastic | 1.545 | 56.1 | −1.70 |
| 2 | | 2.955 | (ASP) | 0.168 | | | | |
| 3 | Ape. Stop | Plano | | 0.112 | | | | |
| 4 | Lens 2 | −3.351 | (ASP) | 0.809 | Plastic | 1.544 | 56.0 | 2.53 |
| 5 | | −1.057 | (ASP) | −0.203 | | | | |
| 6 | Stop | Plano | | 0.233 | | | | |
| 7 | Lens 3 | 1.224 | (ASP) | 0.990 | Plastic | 1.544 | 56.0 | 0.72 |
| 8 | | −0.408 | (ASP) | 0.075 | | | | |
| 9 | Lens 4 | −0.291 | (ASP) | 0.441 | Plastic | 1.669 | 19.4 | −1.56 |
| 10 | | −0.648 | (ASP) | 0.430 | | | | |
| 11 | IR-Cut Filter | Plano | | 0.210 | Glass | 1.517 | 64.2 | — |
| 12 | | Plano | | 0.329 | | | | |
| 13 | Image | Plano | | 0.000 | | | | |

Note:
Reference wavelength is 587.6 nm (d-line).
An effective radius of the stop 701 (Surface 6) is 0.614 mm.

TABLE 14

| Aspheric Coefficients | | | | |
|---|---|---|---|---|
| Surface # | 1 | 2 | 4 | 5 |
| k= | −7.3258E+01 | 0.0000E+00 | 0.0000E+00 | 0.0000E+00 |
| A4= | 8.8403E−01 | 4.4739E+00 | 9.1663E−01 | −1.1295E+00 |
| A6= | 4.7153E+00 | 1.7968E+01 | 2.6656E+00 | 1.0260E+01 |
| A8= | −4.9595E+01 | −5.7581E+02 | −1.3068E+01 | −5.1203E+01 |
| A10= | 2.2657E+02 | 8.0448E+03 | −2.1192E+01 | 1.4509E+02 |
| A12= | −5.5170E+02 | −6.2731E+04 | — | −2.1583E+02 |
| A14= | 6.9765E+02 | 3.8961E+05 | — | 1.2868E+02 |
| A16= | −3.6117E+02 | −1.1506E+06 | — | — |
| Surface # | 7 | 8 | 9 | 10 |
| k= | −2.0176E+01 | −4.6797E+00 | −2.3712E+00 | −9.2305E−01 |
| A4= | 1.6627E−01 | −2.0211E+00 | −1.9775E−01 | 1.1977E+00 |
| A6= | 3.6505E+00 | 1.6040E+01 | 6.6611E+00 | 8.8510E−02 |
| A8= | −2.6797E+01 | −7.3484E+01 | −3.4205E+01 | −3.0662E+00 |
| A10= | 9.8058E+01 | 1.8966E+02 | 6.3784E+01 | 5.9913E+00 |
| A12= | −2.1525E+02 | −2.7274E+02 | 3.1014E+01 | −8.8102E+00 |
| A14= | 2.7840E+02 | 1.9694E+02 | −3.2797E+02 | 2.4985E+01 |
| A16= | −1.9130E+02 | −4.3262E+01 | 5.5774E+02 | −5.2214E+01 |
| A18= | 5.2157E+01 | −1.1814E+01 | −4.1361E+02 | 4.9957E+01 |
| A20= | — | — | 1.1716E+02 | −1.7442E+01 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.95 | CT2/CT3 | 0.82 |
| Fno | 2.04 | Td/BL | 2.97 |
| HFOV [deg.] | 51.0 | (R1 + R2)/(R1 − R2) | −0.36 |
| V1/N1 | 36.30 | f/R1 | −0.68 |
| V2/N2 | 36.26 | f/R8 | −1.46 |
| V3/N3 | 36.26 | R7/f + R8/f | −0.99 |
| V4/N4 | 11.65 | Y42/Y11 | 1.42 |
| CT1/T12 | 0.90 | Yc11/f | 0.31 |
| CT1/CT2 | 0.31 | Yc42/f | 0.72 |
| T12/(T23 + T34) | 2.67 | — | — |

8th Embodiment

Figure 15:
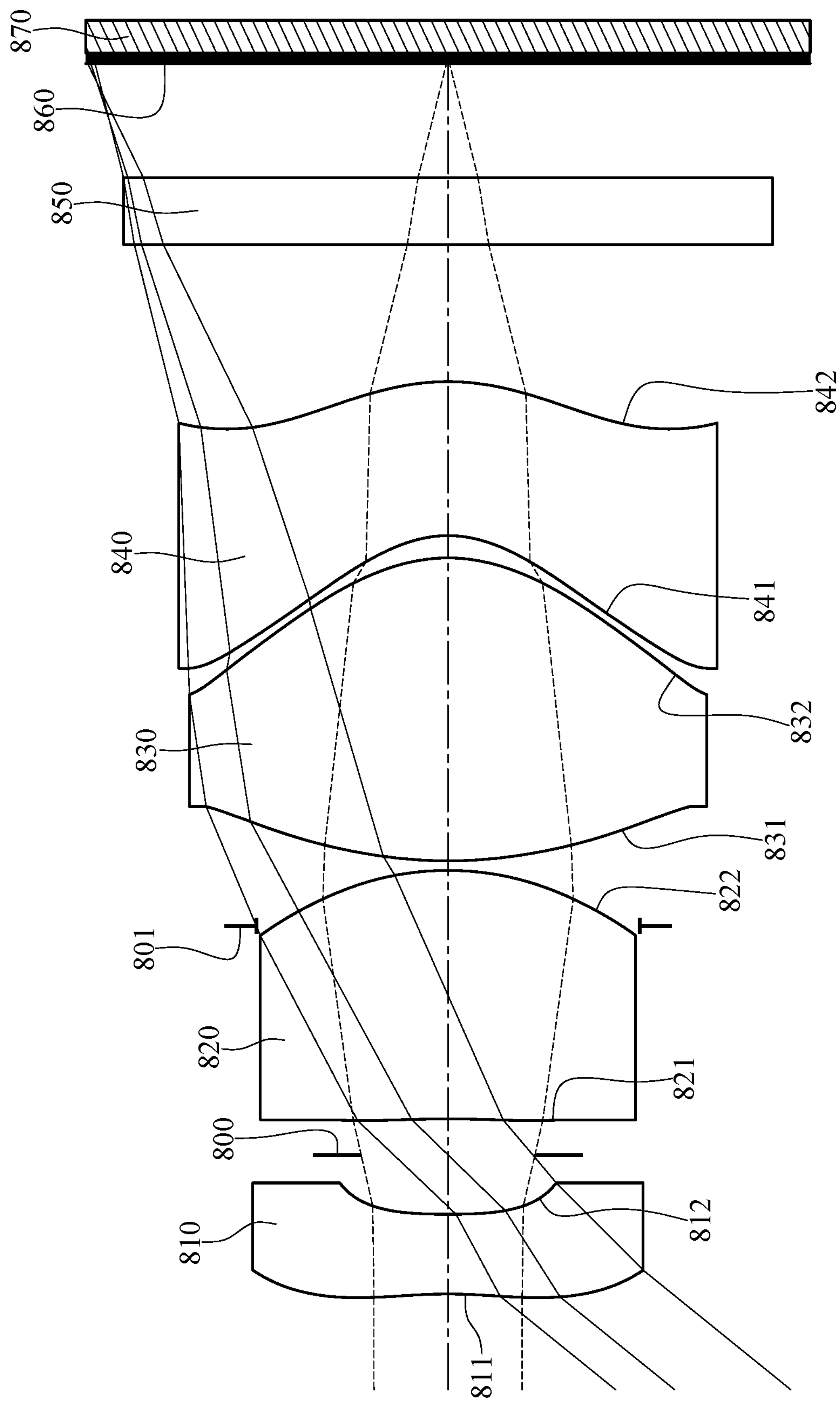
FIG. 15 is a schematic view of an optical lens assembly and an image sensor of an electronic device according to the 8th embodiment of the present disclosure.
Figure 16:
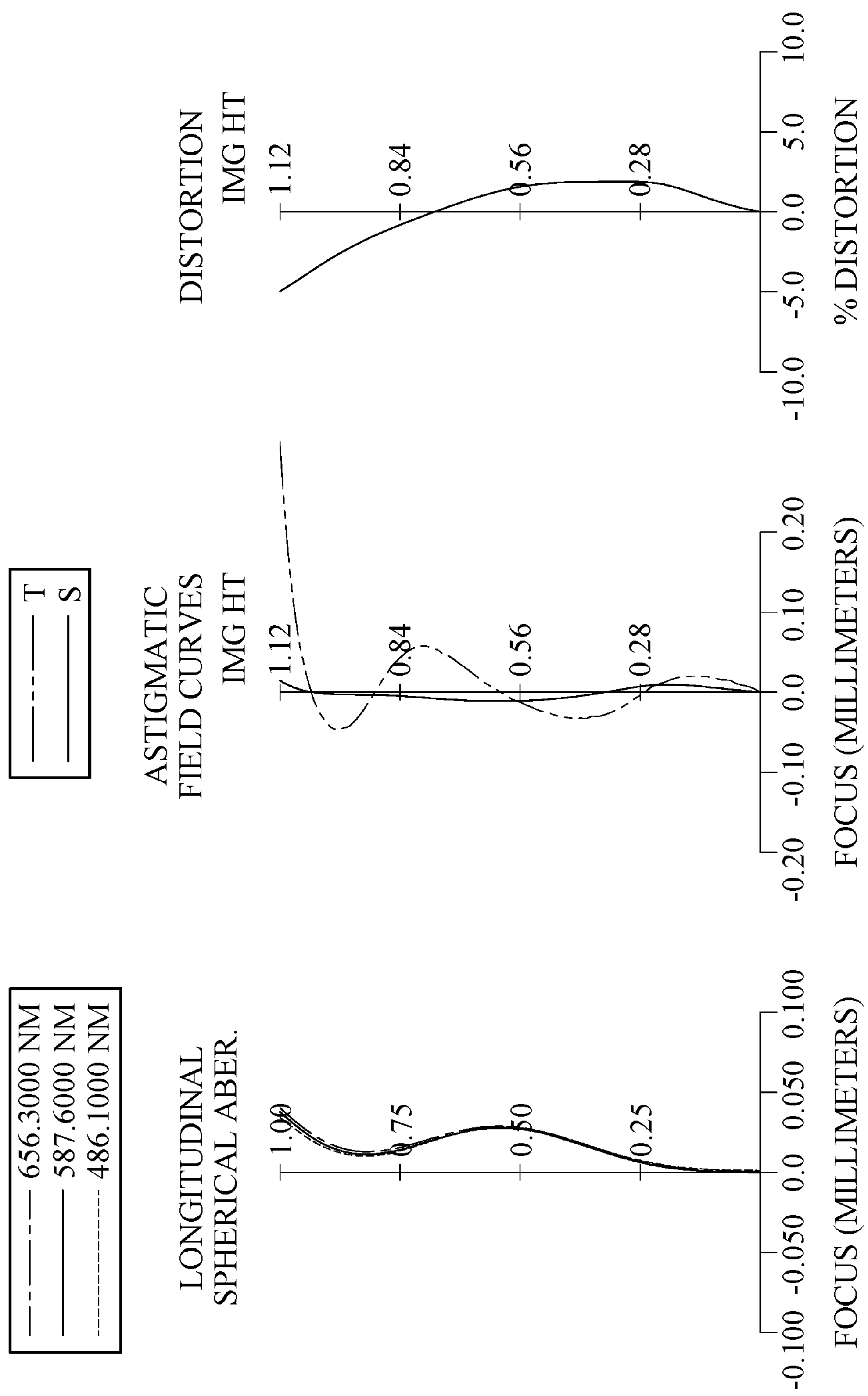
FIG. 16 shows spherical aberration curves, astigmatic field curves and a distortion curve of the optical lens assembly of the electronic device according to the 8th embodiment.

FIG. 15 is a schematic view of an optical lens assembly and an image sensor of an electronic device according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical lens assembly (its reference numeral is omitted) of the present disclosure and an image sensor 870. The optical lens assembly includes, in order from an outer side to an inner side, a first lens element 810, an aperture stop 800, a second lens element 820, a stop 801, a third lens element 830, a fourth lens element 840, an IR-cut filter 850 and an image surface 860. The optical lens assembly includes four lens elements (810, 820, 830 and 840) with no additional lens element disposed between each of the adjacent four lens elements.

The first lens element 810 with negative refractive power has an outer-side surface 811 being concave in a paraxial region thereof and an inner-side surface 812 being concave in a paraxial region thereof. The first lens element 810 is made of plastic material and has the outer-side surface 811 and the inner-side surface 812 being both aspheric. The outer-side surface 811 of the first lens element 810 has at least one convex critical point in an off-axis region thereof.

The second lens element 820 with positive refractive power has an outer-side surface 821 being concave in a paraxial region thereof and an inner-side surface 822 being convex in a paraxial region thereof. The second lens element 820 is made of plastic material and has the outer-side surface 821 and the inner-side surface 822 being both aspheric. The outer-side surface 821 of the second lens element 820 has at least one convex critical point in an off-axis region thereof.

The third lens element 830 with positive refractive power has an outer-side surface 831 being convex in a paraxial region thereof and an inner-side surface 832 being convex in a paraxial region thereof. The third lens element 830 is made of plastic material and has the outer-side surface 831 and the inner-side surface 832 being both aspheric.

The fourth lens element 840 with negative refractive power has an outer-side surface 841 being concave in a paraxial region thereof and an inner-side surface 842 being convex in a paraxial region thereof. The fourth lens element 840 is made of plastic material and has the outer-side surface 841 and the inner-side surface 842 being both aspheric. The inner-side surface 842 of the fourth lens element 840 has at least one concave critical point in an off-axis region thereof.

The IR-cut filter 850 is made of glass material and located between the fourth lens element 840 and the image surface 860, and will not affect the focal length of the optical lens assembly. The image sensor 870 is disposed on or near the image surface 860 of the optical lens assembly.

The detailed optical data of the 8th embodiment are shown in Table 15 and the aspheric surface data are shown in Table 16 below.

TABLE 15

| 8th Embodiment<br>f = 0.95 mm, Fno = 2.04, HFOV = 51.0 deg. | | | | | | | |
|---|---|---|---|---|---|---|---|
| Surface # | | Curvature Radius | Thickness | Material | Index | Abbe # | Focal Length |
| 0 | Object | Plano | 400.000 | | | | |
| 1 | Lens 1 | −1.415 (ASP) | 0.250 | Plastic | 1.545 | 56.1 | −1.61 |
| 2 | | 2.433 (ASP) | 0.186 | | | | |
| 3 | Ape. Stop | Plano | 0.113 | | | | |
| 4 | Lens 2 | −3.532 (ASP) | 0.779 | Plastic | 1.544 | 56.0 | 2.08 |
| 5 | | −0.924 (ASP) | −0.174 | | | | |
| 6 | Stop | Plano | 0.204 | | | | |
| 7 | Lens 3 | 1.359 (ASP) | 0.950 | Plastic | 1.544 | 56.0 | 0.84 |
| 8 | | −0.518 (ASP) | 0.070 | | | | |
| 9 | Lens 4 | −0.363 (ASP) | 0.483 | Plastic | 1.669 | 19.4 | −2.31 |
| 10 | | −0.728 (ASP) | 0.430 | | | | |
| 11 | IR-Cut Filter | Plano | 0.210 | Glass | 1.517 | 64.2 | — |
| 12 | | Plano | 0.357 | | | | |
| 13 | Image | Plano | 0.000 | | | | |

Note:

Reference wavelength is 587.6 nm (d-line).

An effective radius of the stop 801 (Surface 6) is 0.601 mm.

TABLE 16

| Aspheric Coefficients | | | | |
|---|---|---|---|---|
| Surface # | 1 | 2 | 4 | 5 |
| k= | −5.7248E+01 | 0.0000E+00 | 0.0000E+00 | 0.0000E+00 |
| A4= | 1.5088E+00 | 2.8247E+00 | 4.4956E−01 | −2.8520E−01 |
| A6= | −2.6722E+00 | 1.9419E+02 | 1.2842E+01 | 6.6140E−01 |
| A8= | 2.4024E+00 | −8.3208E+03 | −1.0549E+02 | 8.9218E+00 |
| A10= | 5.9163E+00 | 1.8750E+05 | 2.7282E+02 | −3.9368E+01 |
| A12= | −9.9860E+00 | −2.3932E+06 | — | 5.6575E+01 |
| A14= | — | 1.7304E+07 | — | −2.5756E+01 |
| A16= | — | −6.4545E+07 | — | — |
| A18= | — | 9.4617E+07 | — | — |
| Surface # | 7 | 8 | 9 | 10 |
| k= | −1.2587E+01 | −3.4013E+00 | −2.3332E+00 | −8.3336E−01 |
| A4= | −2.6687E−02 | −8.5110E−01 | −9.0789E−01 | 9.8500E−01 |
| A6= | 3.1015E+00 | −1.3524E+00 | 5.7263E+00 | −2.0304E+00 |
| A8= | −2.2934E+01 | 3.1512E+01 | −1.3653E+01 | 1.6233E+01 |
| A10= | 1.0063E+02 | −1.6290E+02 | 2.0152E+01 | −6.6421E+01 |
| A12= | −2.6135E+02 | 4.9335E+02 | −2.8182E+01 | 1.5441E+02 |
| A14= | 3.7800E+02 | −9.5223E+02 | 2.6936E+01 | −2.1849E+02 |
| A16= | −2.7555E+02 | 1.1207E+03 | 1.1454E+01 | 1.8516E+02 |
| A18= | 7.5661E+01 | −7.1675E+02 | −4.1903E+01 | −8.5441E+01 |
| A20= | — | 1.8836E+02 | 2.0750E+01 | 1.6239E+01 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 0.95 | CT2/CT3 | 0.82 |
| Fno | 2.04 | Td/BL | 2.87 |
| HFOV[deg.] | 51.0 | (R1 + R2)/(R1 − R2) | −0.26 |
| V1/N1 | 36.30 | f/R1 | −0.67 |
| V2/N2 | 36.26 | f/R8 | −1.30 |
| V3/N3 | 36.26 | R7/f + R8/f | −1.15 |
| V4/N4 | 11.65 | Y42/Y11 | 1.38 |
| CT1/T12 | 0.84 | Yc11/f | 0.30 |
| CT1/CT2 | 0.32 | Yc42/f | 0.73 |
| T12/(T23 + T34) | 2.99 | — | — |

9th Embodiment

Figure 17:
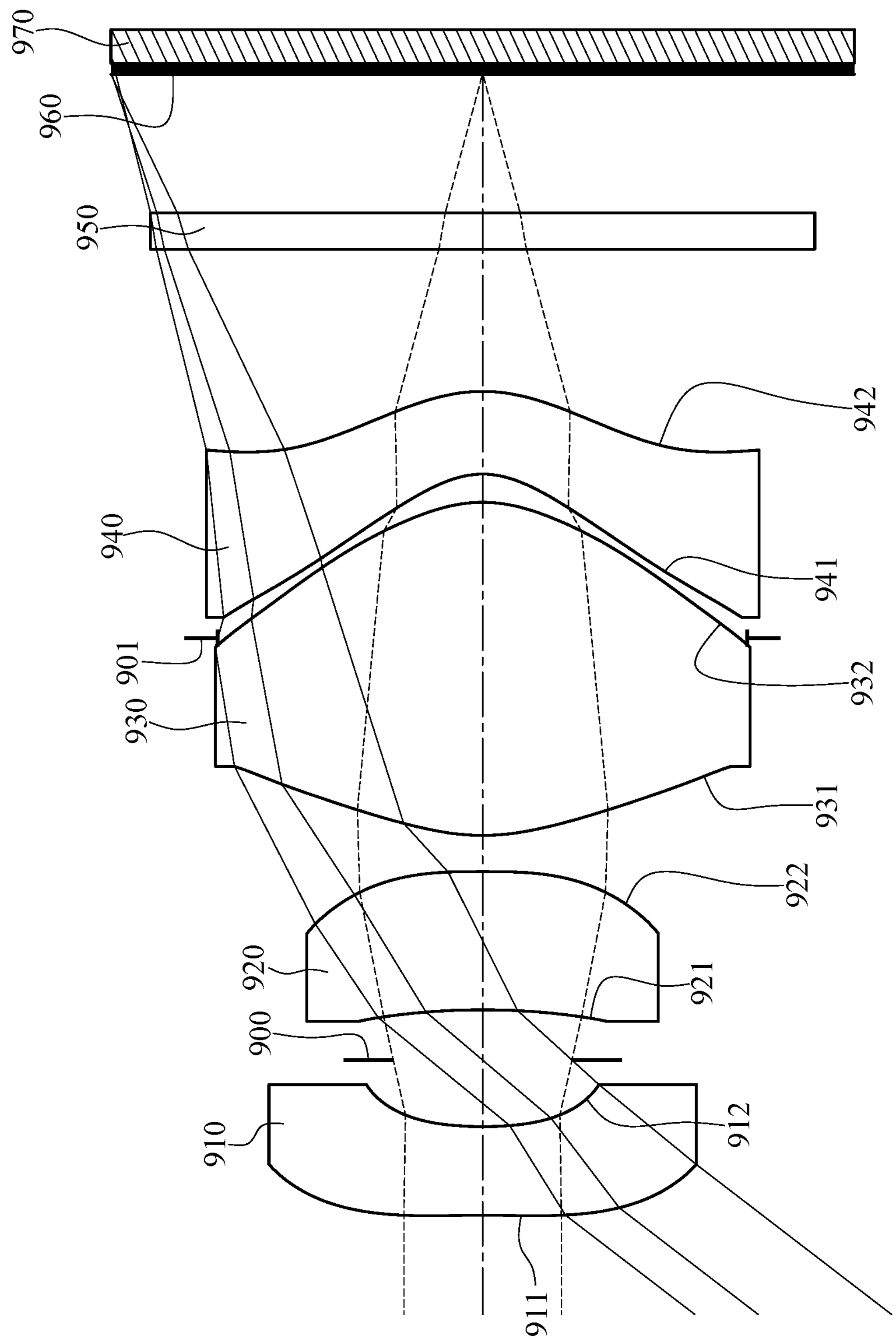
FIG. 17 is a perspective view of an optical lens assembly and an image sensor of an electronic device according to the 9th embodiment of the present disclosure.
Figure 18:
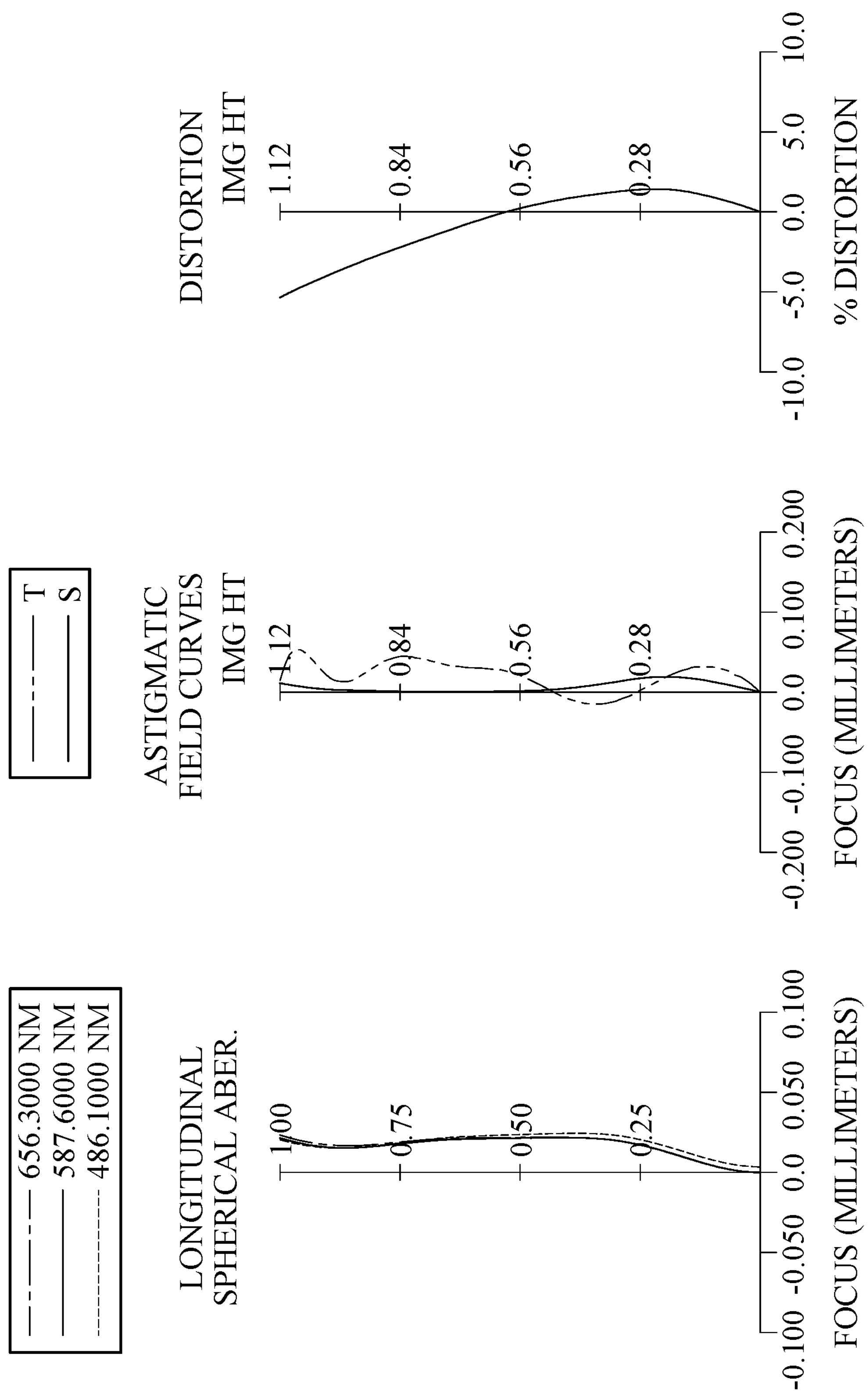
FIG. 18 shows spherical aberration curves, astigmatic field curves and a distortion curve of the optical lens assembly of the electronic device according to the 9th embodiment.

FIG. 17 is a schematic view of an optical lens assembly and an image sensor of an electronic device according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical lens assembly (its reference numeral is omitted) of the present disclosure and an image sensor 970. The optical lens assembly includes, in order from an outer side to an inner side, a first lens element 910, an aperture stop 900, a second lens element 920, a third lens element 930, a stop 901, a fourth lens element 940, an IR-cut filter 950 and an image surface 960. The optical lens assembly includes four lens elements (910, 920, 930 and 940) with no additional lens element disposed between each of the adjacent four lens elements.

The first lens element 910 with negative refractive power has an outer-side surface 911 being concave in a paraxial region thereof and an inner-side surface 912 being concave in a paraxial region thereof. The first lens element 910 is made of plastic material and has the outer-side surface 911 and the inner-side surface 912 being both aspheric. The outer-side surface 911 of the first lens element 910 has at least one convex critical point in an off-axis region thereof.

The second lens element 920 with negative refractive power has an outer-side surface 921 being concave in a paraxial region thereof and an inner-side surface 922 being convex in a paraxial region thereof. The second lens element 920 is made of plastic material and has the outer-side surface 921 and the inner-side surface 922 being both aspheric.

The third lens element 930 with positive refractive power has an outer-side surface 931 being convex in a paraxial region thereof and an inner-side surface 932 being convex in a paraxial region thereof. The third lens element 930 is made of plastic material and has the outer-side surface 931 and the inner-side surface 932 being both aspheric.

The fourth lens element 940 with negative refractive power has an outer-side surface 941 being concave in a paraxial region thereof and an inner-side surface 942 being convex in a paraxial region thereof. The fourth lens element 940 is made of plastic material and has the outer-side surface 941 and the inner-side surface 942 being both aspheric. The inner-side surface 942 of the fourth lens element 940 has at least one concave critical point in an off-axis region thereof.

The IR-cut filter 950 is made of glass material and located between the fourth lens element 940 and the image surface 960, and will not affect the focal length of the optical lens assembly. The image sensor 970 is disposed on or near the image surface 960 of the optical lens assembly.

The detailed optical data of the 9th embodiment are shown in Table 17 and the aspheric surface data are shown in Table 18 below.

TABLE 17

| 9th Embodiment f = 0.90 mm, Fno = 1.90, HFOV = 52.5 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −5.271 | (ASP) | 0.268 | Plastic | 1.570 | 57.0 | −1.59 |
| 2 | | 1.118 | (ASP) | 0.201 | | | | |
| 3 | Ape. Stop | Plano | | 0.152 | | | | |
| 4 | Lens 2 | −2.256 | (ASP) | 0.418 | Plastic | 1.570 | 57.0 | −9.76 |
| 5 | | −4.049 | (ASP) | 0.109 | | | | |
| 6 | Lens 3 | 0.640 | (ASP) | 1.007 | Plastic | 1.570 | 57.0 | 0.67 |
| 7 | | −0.407 | (ASP) | −0.411 | | | | |
| 8 | Stop | Plano | | 0.496 | | | | |
| 9 | Lens 4 | −0.256 | (ASP) | 0.250 | Plastic | 1.700 | 17.5 | −1.40 |
| 10 | | −0.485 | (ASP) | 0.430 | | | | |
| 11 | IR-Cut Filter | Plano | | 0.110 | Glass | 1.517 | 64.2 | — |
| 12 | | Plano | | 0.418 | | | | |
| 13 | Image | Plano | | 0.000 | | | | |

Note:
Reference wavelength is 587.6 nm (d-line).
An effective radius of the stop 901 (Surface 8) is 0.800 mm.

TABLE 18

| Aspheric Coefficients | | | | |
|---|---|---|---|---|
| Surface # | 1 | 2 | 4 | 5 |
| k= | −8.6280E+01 | 2.9138E−02 | 5.1488E−02 | 2.1986E+00 |
| A4= | 2.1226E+00 | 2.8184E+00 | −7.7556E−01 | −4.6170E+00 |
| A6= | −1.1050E+01 | 5.1123E+01 | 3.1608E+01 | 3.5666E+01 |
| A8= | 7.6285E+01 | −1.3363E+03 | −1.1128E+03 | −2.4626E+02 |
| A10= | −4.2838E+02 | 9.4641E+03 | 2.6832E+04 | 7.3249E+02 |
| A12= | 1.7264E+03 | 2.4177E+05 | −4.1124E+05 | 3.8022E+03 |
| A14= | −4.6152E+03 | −5.8701E+06 | 3.9181E+06 | −4.7441E+04 |
| A16= | 7.6984E+03 | 5.3070E+07 | −2.2342E+07 | 1.9980E+05 |
| A18= | −7.1607E+03 | −2.2002E+08 | 6.9245E+07 | −4.0103E+05 |
| A20= | 2.8019E+03 | 3.4231E+08 | −8.9048E+07 | 3.1883E+05 |
| Surface # | 6 | 7 | 9 | 10 |
| k= | −1.1207E+01 | −5.2598E+00 | −2.2837E+00 | −1.1872E+00 |
| A4= | 9.3653E−01 | −2.8455E+00 | 1.3408E−01 | 2.1406E+00 |
| A6= | −1.0402E+01 | 3.5619E+01 | 1.2302E+01 | −2.3561E+00 |
| A8= | 7.6095E+01 | −2.8880E+02 | −1.5162E+02 | −1.4883E+01 |
| A10= | −3.8165E+02 | 1.3933E+03 | 8.8700E+02 | 1.2148E+02 |
| A12= | 1.3064E+03 | −4.1221E+03 | −2.9520E+03 | −4.1091E+02 |
| A14= | −2.9706E+03 | 7.5731E+03 | 5.8718E+03 | 7.7281E+02 |
| A16= | 4.2731E+03 | −8.4079E+03 | −6.8888E+03 | −8.4035E+02 |
| A18= | −3.5076E+03 | 5.1465E+03 | 4.3677E+03 | 4.9504E+02 |
| A20= | 1.2462E+03 | −1.3274E+03 | −1.1411E+03 | −1.2228E+02 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.90 | CT2/CT3 | 0.42 |
| Fno | 1.90 | Td/BL | 2.60 |
| HFOV [deg.] | 52.5 | (R1 + R2)/(R1 − R2) | 0.65 |

-continued

| 9th Embodiment | | | |
|---|---|---|---|
| V1/N1 | 36.31 | f/R1 | −0.17 |
| V2/N2 | 36.31 | f/R8 | −1.86 |
| V3/N3 | 36.31 | R7/f + R8/f | −0.82 |
| V4/N4 | 10.29 | Y42/Y11 | 1.29 |
| CT1/T12 | 0.76 | Yc11/f | 0.18 |
| CT1/CT2 | 0.64 | Yc42/f | 0.78 |
| T12/(T23 + T34) | 1.82 | — | — |

10th Embodiment

Figure 19:
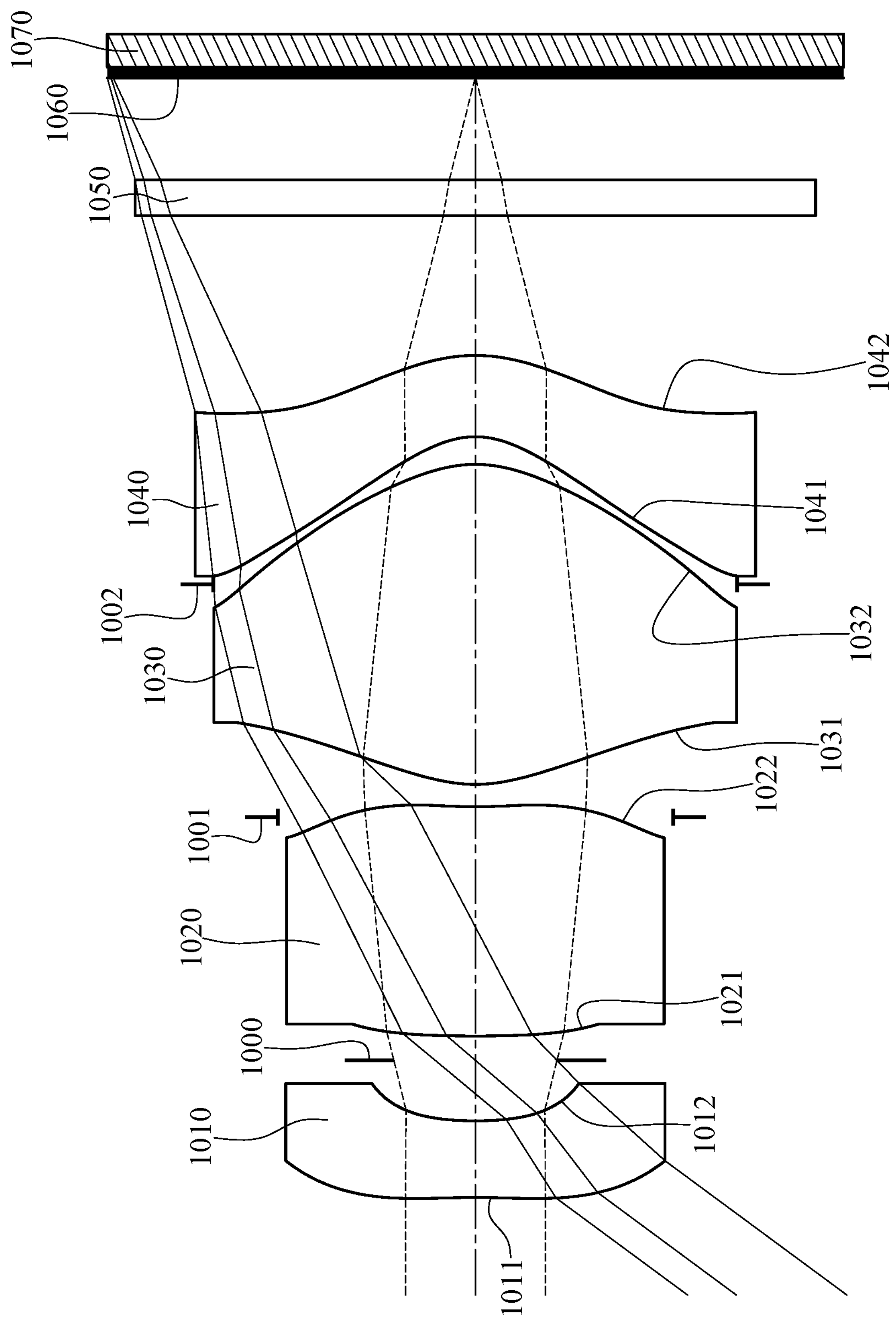
FIG. 19 is a perspective view of an optical lens assembly and an image sensor of an electronic device according to the 10th embodiment of the present disclosure.
Figure 20:
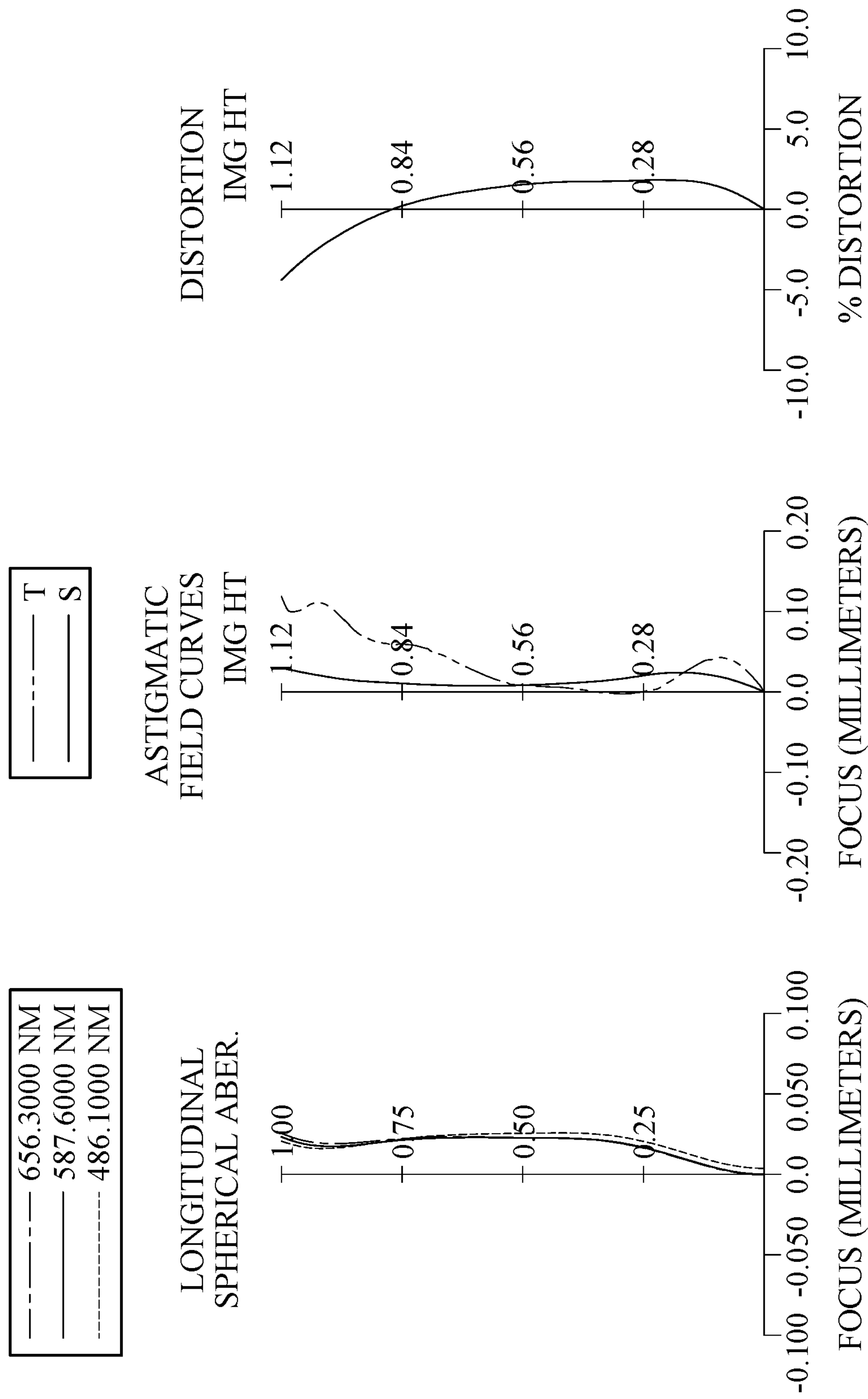
FIG. 20 shows spherical aberration curves, astigmatic field curves and a distortion curve of the optical lens assembly of the electronic device according to the 10th embodiment.

FIG. 19 is a schematic view of an optical lens assembly and an image sensor of an electronic device according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical lens assembly (its reference numeral is omitted) of the present disclosure and an image sensor 1070. The optical lens assembly includes, in order from an outer side to an inner side, a first lens element 1010, an aperture stop 1000, a second lens element 1020, a stop 1001, a third lens element 1030, a stop 1002, a fourth lens element 1040, an IR-cut filter 1050 and an image surface 1060. The optical lens assembly includes four lens elements (1010, 1020, 1030 and 1040) with no additional lens element disposed between each of the adjacent four lens elements.

The first lens element 1010 with negative refractive power has an outer-side surface 1011 being concave in a paraxial region thereof and an inner-side surface 1012 being concave in a paraxial region thereof. The first lens element 1010 is made of plastic material and has the outer-side surface 1011 and the inner-side surface 1012 being both aspheric. The outer-side surface 1011 of the first lens element 1010 has at least one convex critical point in an off-axis region thereof.

The second lens element 1020 with negative refractive power has an outer-side surface 1021 being convex in a paraxial region thereof and an inner-side surface 1022 being concave in a paraxial region thereof. The second lens element 1020 is made of plastic material and has the outer-side surface 1021 and the inner-side surface 1022 being both aspheric.

The third lens element 1030 with positive refractive power has an outer-side surface 1031 being convex in a paraxial region thereof and an inner-side surface 1032 being convex in a paraxial region thereof. The third lens element 1030 is made of plastic material and has the outer-side surface 1031 and the inner-side surface 1032 being both aspheric.

The fourth lens element 1040 with negative refractive power has an outer-side surface 1041 being concave in a paraxial region thereof and an inner-side surface 1042 being convex in a paraxial region thereof. The fourth lens element 1040 is made of plastic material and has the outer-side surface 1041 and the inner-side surface 1042 being both aspheric. The inner-side surface 1042 of the fourth lens element 1040 has at least one concave critical point in an off-axis region thereof.

The IR-cut filter 1050 is made of glass material and located between the fourth lens element 1040 and the image surface 1060, and will not affect the focal length of the optical lens assembly. The image sensor 1070 is disposed on or near the image surface 1060 of the optical lens assembly.

The detailed optical data of the 10th embodiment are shown in Table 19 and the aspheric surface data are shown in Table 20 below.

TABLE 19

| 10th Embodiment<br>f = 0.86 mm, Fno = 2.00, HFOV = 53.6 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −2.605 | (ASP) | 0.236 | Plastic | 1.572 | 57.0 | −1.34 |
| 2 | | 1.116 | (ASP) | 0.186 | | | | |
| 3 | Ape. Stop | Plano | | 0.075 | | | | |
| 4 | Lens 2 | 4.501 | (ASP) | 0.705 | Plastic | 1.572 | 57.0 | −3.36 |
| 5 | | 1.269 | (ASP) | −0.032 | | | | |
| 6 | Stop | Plano | | 0.101 | | | | |
| 7 | Lens 3 | 0.448 | (ASP) | 0.985 | Plastic | 1.572 | 57.0 | 0.64 |
| 8 | | −0.386 | (ASP) | −0.369 | | | | |
| 9 | Stop | Plano | | 0.454 | | | | |
| 10 | Lens 4 | −0.253 | (ASP) | 0.250 | Plastic | 1.707 | 17.5 | −1.22 |
| 11 | | −0.503 | (ASP) | 0.430 | | | | |
| 12 | IR-Cut Filter | Plano | | 0.110 | Glass | 1.518 | 64.2 | — |
| 13 | | Plano | | 0.314 | | | | |
| 14 | Image | Plano | | 0.000 | | | | |

Note:
Reference wavelength is 587.6 nm (d-line).
An effective radius of the stop 1001 (Surface 6) is 0.608 mm.
An effective radius of the stop 1002 (Surface 9) is 0.805 mm.

TABLE 20

| Aspheric Coefficients | | | | |
|---|---|---|---|---|
| Surface # | 1 | 2 | 4 | 5 |
| k= | −9.9000E+01 | 6.0087E+00 | 3.8174E+01 | −2.3625E−01 |
| A4= | 2.9955E+00 | 4.9655E+00 | 5.9208E−01 | −9.5693E+00 |
| A6= | −1.9646E+01 | 3.0586E+01 | 1.2780E+01 | 1.1031E+02 |
| A8= | 1.6062E+02 | −1.4567E+03 | −4.2587E+02 | −1.1215E+03 |
| A10= | −1.0906E+03 | 2.5579E+04 | 1.0587E+04 | 8.2828E+03 |
| A12= | 5.4230E+03 | −1.1938E+05 | −1.5943E+05 | −4.2019E+04 |
| A14= | −1.8295E+04 | −1.7116E+06 | 1.4286E+06 | 1.4208E+05 |
| A16= | 3.9207E+04 | 2.4912E+07 | −7.5220E+06 | −3.0486E+05 |

TABLE 20-continued

| Aspheric Coefficients | | | | |
|---|---|---|---|---|
| A18= | −4.7754E+04 | −9.4473E+07 | 2.1594E+07 | 3.7472E+05 |
| A20= | 2.4955E+04 | 3.3966E+07 | −2.6246E+07 | −2.0037E+05 |
| Surface # | 7 | 8 | 10 | 11 |
| k= | −6.7603E+00 | −5.6258E+00 | −2.4997E+00 | −1.2558E+00 |
| A4= | −3.0496E−01 | −3.3853E+00 | −6.1615E−01 | 2.0840E+00 |
| A6= | 2.7104E+00 | 4.5137E+01 | 1.8124E+01 | −3.6037E+00 |
| A8= | −2.0084E+01 | −3.7283E+02 | −1.8449E+02 | −5.9603E+00 |
| A10= | 6.6826E+01 | 1.8404E+03 | 1.0295E+03 | 9.4810E+01 |
| A12= | −5.0776E+01 | −5.6308E+03 | −3.3771E+03 | −3.6854E+02 |
| A14= | −3.1044E+02 | 1.0822E+04 | 6.6921E+03 | 7.2963E+02 |
| A16= | 9.8500E+02 | −1.2757E+04 | −7.9069E+03 | −8.0531E+02 |
| A18= | −1.1500E+03 | 8.4524E+03 | 5.1502E+03 | 4.7367E+02 |
| A20= | 4.9203E+02 | −2.4140E+03 | −1.4287E+03 | −1.1621E+02 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 0.86 | CT2/CT3 | 0.72 |
| Fno | 2.00 | Td/BL | 3.03 |
| HFOV [deg.] | 53.6 | (R1 + R2)/(R1 − R2) | 0.40 |
| V1/N1 | 36.31 | f/R1 | −0.33 |
| V2/N2 | 36.31 | f/R8 | −1.71 |
| V3/N3 | 36.31 | R7/f + R8/f | −0.88 |
| V4/N4 | 10.29 | Y42/Y11 | 1.48 |
| CT1/T12 | 0.90 | Yc11/f | 0.22 |
| CT1/CT2 | 0.33 | Yc42/f | 0.90 |
| T12/(T23 + T34) | 1.69 | — | — |

11th Embodiment

Figure 21:
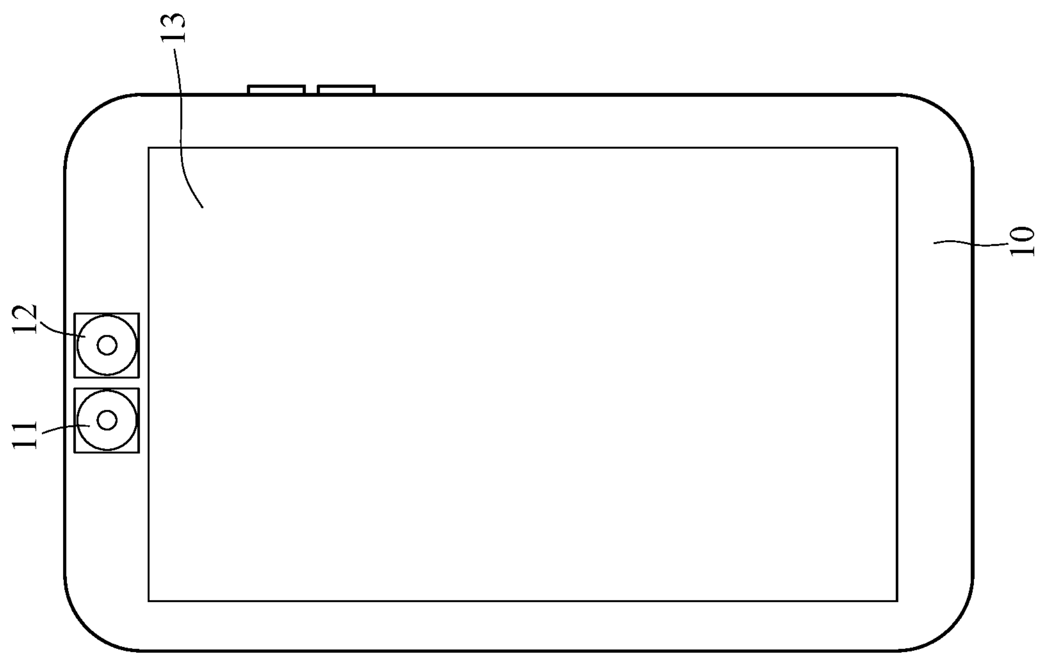
FIG. 21 is a perspective view of an electronic device according to the 11th embodiment of the present disclosure.

FIG. 21 is a perspective view of an electronic device according to the 11th embodiment of the present disclosure.

In this embodiment, an electronic device 10 is a smartphone including an image capturing unit 11, a projection unit 12 and a display unit 13. The image capturing unit 11 includes the optical lens assembly disclosed in the 4th embodiment and an image sensor (their reference numbers are omitted). The projection unit 12 includes a light source (its reference number is omitted) emitting, for example, visible light having a wavelength range of 400 nm to 750 nm or infrared light having a wavelength range of 750 nm to 1600 nm.

The light source of the projection unit 12 can be a laser, a superluminescent diode (SLED), a micro LED, a resonant cavity light emitting diode (RCLED), a vertical cavity surface emitting laser (VCSEL) and the like. The light source can be a single light source or multiple light sources to present good projection quality. In a case that the light source of the projection unit 12 is a VCSEL, the light source is favorable for the projection unit 12 to emit high directional light rays having low divergence and high intensity. The light source of the projection unit 12 can project light rays onto a detected object. In this embodiment, besides capturing images, the image capturing unit 11 can be used as a receiving unit corresponding to the projection unit 12. The light rays from the projection unit 12 are reflected by the detected object, then travel into the image capturing unit 11, pass through the optical lens assembly and finally are imaged on the image sensor.

The projection device 12 may further include a diffractive optical element (not shown). The diffractive optical element helps project the light evenly onto the detected object O, or helps diffract the light to enlarge the projection angle and the projection field. The diffractive optical element can be a diffuser, a raster or a combination thereof (but not limited thereto). The diffractive optical element can have a micro structure such as a diffraction grating for scattering the light and replicating a speckle pattern generated by the scattered light, thereby enlarging the projection angle of the projection device 12.

In this embodiment, the image capturing unit 11 features functions of optical imaging and receiving single-wavelength light, and the single-wavelength light can be, but not limited to, visible light or infrared light. The electronic device 10 in FIG. 21 has the image capturing unit 11, the projection unit 12 and the display unit 13 on the same side thereof such that the image capturing unit 11 can be configured as a front-facing camera for taking selfies, but the present disclosure is not limited thereto.

12th Embodiment

Figure 22:
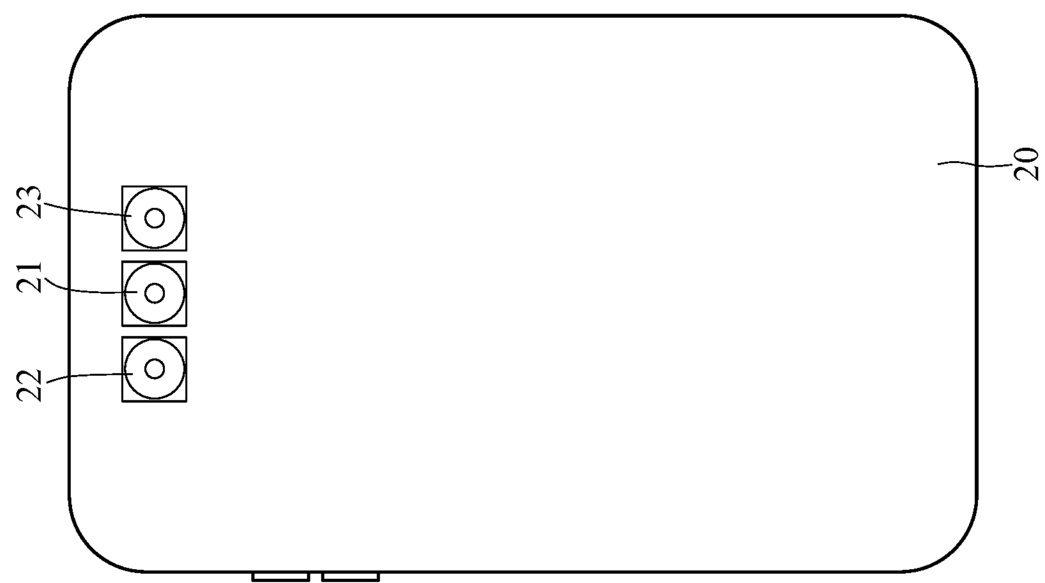
FIG. 22 is a perspective view of an electronic device according to the 12th embodiment of the present disclosure.

FIG. 22 is a perspective view of an electronic device according to the 12th embodiment of the present disclosure. In this embodiment, an electronic device 20 is a smartphone including an image capturing unit 21, a receiving unit 22, a projection unit 23 and a display unit (its reference number is omitted). The image capturing unit 21 includes the optical lens assembly disclosed in the 1st embodiment and an image sensor (their reference numbers are omitted), and the receiving unit 22 can include the optical lens assembly disclosed in one of the above embodiments. That is, in comparison with the electronic device 10 in FIG. 21, the electronic device 20 is equipped with the image capturing unit 21 and the receiving unit 22 that are functionally independent. The projection unit 23 has a configuration the same as that of the projection unit 12 disclosed in the 11th embodiment, so an explanation in this regard will not be provided again. In this embodiment, the image capturing unit 21, the receiving unit 22 and the projection unit 23 are all disposed on one side of the electronic device 20, while the display unit is disposed on the opposite side of the electronic device 20.

13th Embodiment

Figure 23:
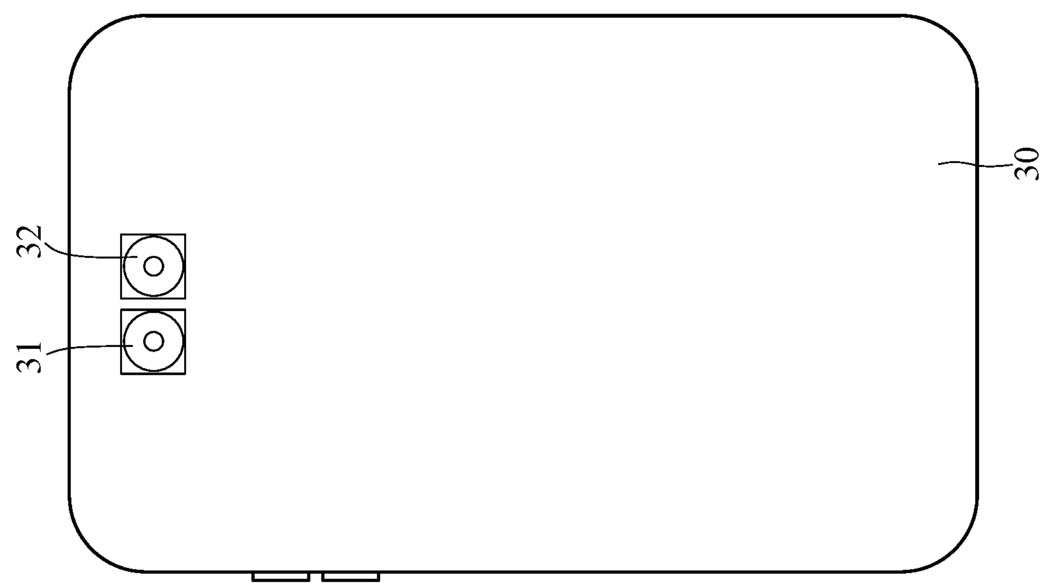
FIG. 23 is a perspective view of an electronic device according to the 13th embodiment of the present disclosure.

FIG. 23 is a perspective view of an electronic device according to the 13th embodiment of the present disclosure. In this embodiment, an electronic device 30 is a smartphone including an image capturing unit 31, a projection unit 32 and a display unit (its reference number is omitted). The image capturing unit 31 includes the optical lens assembly disclosed in the 4th embodiment and an image sensor (their reference numbers are omitted). The projection unit 32 has a configuration the same as that of the projection unit 12 disclosed in the 11th embodiment, so an explanation in this regard will not be provided again. Besides capturing images, the image capturing unit 31 can be used as a receiving unit corresponding to the projection unit 32. In this embodiment, the image capturing unit 31 and the projection unit 32 are both disposed on one side of the electronic device 30, while the display unit is disposed on the opposite side of the electronic device 30.

The smartphone in this embodiment is only exemplary for showing the image capturing units including the optical lens assembly of the present disclosure installed in an electronic device, and the present disclosure is not limited thereto. The optical lens assembly can be optionally applied to systems with a movable focus. Furthermore, the optical lens assembly of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An electronic device comprising:

an optical lens assembly comprising four lens elements, the four lens elements being, in order from an outer side to an inner side, a first lens element, a second lens element, a third lens element and a fourth lens element;

wherein the first lens element has negative refractive power, an outer-side surface of the first lens element is concave in a paraxial region thereof and has at least one convex critical point in an off-axis region thereof, the second lens element has an outer-side surface being concave in a paraxial region thereof, the third lens element has positive refractive power, the fourth lens element has an inner-side surface being convex in a paraxial region thereof and having at least one concave critical point in an off-axis region thereof, and the optical lens assembly has a total of four lens elements;

wherein a central thickness of the first lens element is CT1, a central thickness of the second lens element is CT2, an axial distance between the first lens element and the second lens element is T12, an axial distance between the second lens element and the third lens element is T23, an axial distance between the third lens element and the fourth lens element is T34, a maximum effective radius of the outer-side surface of the first lens element is Y11, a maximum effective radius of the inner-side surface of the fourth lens element is Y42, and the following conditions are satisfied:

$$CT1/CT2<0.75;$$

$$1.75<T12/(T23+T34); \text{ and}$$

$$1.0<Y42/Y11<2.0.$$

2. The electronic device of claim 1, wherein the central thickness of the first lens element is CT1, the central thickness of the second lens element is CT2, and the following condition is satisfied:

$$0.10<CT1/CT2<0.50.$$

3. The electronic device of claim 1, wherein the axial distance between the first lens element and the second lens element is T12, the axial distance between the second lens element and the third lens element is T23, the axial distance between the third lens element and the fourth lens element is T34, and the following condition is satisfied:

$$2.0<T12/(T23+T34)<5.0.$$

4. The electronic device of claim 1, wherein a curvature radius of an outer-side surface of the fourth lens element is R7, a curvature radius of the inner-side surface of the fourth lens element is R8, a focal length of the optical lens assembly is f, and the following condition is satisfied:

$$-1.50<R7/f+R8/f<-0.30.$$

5. The electronic device of claim 1, wherein a vertical distance between a critical point on the outer-side surface of the first lens element and an optical axis is Yc11, a vertical distance between a critical point on the inner-side surface of the fourth lens element and the optical axis is Yc42, a focal length of the optical lens assembly is f, and the following conditions are satisfied:

$$0.12<Yc11/f<0.50; \text{ and}$$

$$0.40<Yc42/f<1.0.$$

6. The electronic device of claim 1, wherein a refractive index of the fourth lens element is N4, and the following condition is satisfied:

$$8.0<V4/N4<12.0.$$

7. The electronic device of claim 1, wherein the central thickness of the second lens element is CT2, a central thickness of the third lens element is CT3, and the following condition is satisfied:

$$CT2/CT3<0.90.$$

8. The electronic device of claim 1, wherein a focal length of the optical lens assembly is f, a curvature radius of the outer-side surface of the first lens element is R1, and the following condition is satisfied:

$$-1.0<f/R1<-0.20.$$

9. The electronic device of claim 1, wherein a focal length of the optical lens assembly is f, a curvature radius of the inner-side surface of the fourth lens element is R8, and the following condition is satisfied:

$f/R8<-1.0$.

10. The electronic device of claim 1, wherein the central thickness of the first lens element is CT1, the axial distance between the first lens element and the second lens element is T12, and the following condition is satisfied:

$0.50<CT1/T12<1.50$.

11. The electronic device of claim 1, wherein the second lens element has positive refractive power.

12. The electronic device of claim 1, wherein the third lens element has an outer-side surface being convex in a paraxial region thereof and an inner-side surface being convex in a paraxial region thereof.

13. The electronic device of claim 1, wherein an axial distance between the outer-side surface of the first lens element and the inner-side surface of the fourth lens element is Td, an axial distance between the inner-side surface of the fourth lens element and an image surface is BL, and the following condition is satisfied:

$2.20<Td/BL<5.0$.

14. The electronic device of claim 1, wherein the outer-side surface of the second lens element has at least one convex critical point in an off-axis region thereof.

15. An electronic device comprising:

an optical lens assembly comprising four lens elements, the four lens elements being, in order from an outer side to an inner side, a first lens element, a second lens element, a third lens element and a fourth lens element;

wherein the first lens element has negative refractive power, an outer-side surface of the first lens element is concave in a paraxial region thereof and has at least one convex critical point in an off-axis region thereof, the second lens element has an outer-side surface being concave in a paraxial region thereof, the third lens element has positive refractive power, the fourth lens element has an inner-side surface being convex in a paraxial region thereof and having at least one concave critical point in an off-axis region thereof, and the optical lens assembly has a total of four lens elements;

wherein a central thickness of the first lens element is CT1, a central thickness of the second lens element is CT2, an axial distance between the first lens element and the second lens element is T12, an axial distance between the second lens element and the third lens element is T23, an axial distance between the third lens element and the fourth lens element is T34, a curvature radius of the outer-side surface of the first lens element is R1, a curvature radius of an inner-side surface of the first lens element is R2, a maximum effective radius of the outer-side surface of the first lens element is Y11, a maximum effective radius of the inner-side surface of the fourth lens element is Y42, and the following conditions are satisfied:

$CT1/CT2<0.75$;

$0.80<T12/(T23+T34)$;

$(R1+R2)/(R1-R2)<0.70$; and $1.0<Y42/Y11<2.0$.

16. The electronic device of claim 15, wherein the curvature radius of the outer-side surface of the first lens element is R1, the curvature radius of the inner-side surface of the first lens element is R2, and the following condition is satisfied:

$(R1+R2)/(R1-R2)<0.40$.

17. The electronic device of claim 15, wherein the axial distance between the first lens element and the second lens element is T12, the axial distance between the second lens element and the third lens element is T23, the axial distance between the third lens element and the fourth lens element is T34, and the following condition is satisfied:

$1.50<T12/(T23+T34)<7.0$.

18. The electronic device of claim 15, wherein the central thickness of the first lens element is CT1, the central thickness of the second lens element is CT2, and the following condition is satisfied:

$0.10<CT1/CT2<0.50$.

19. The electronic device of claim 15, wherein an axial distance between the outer-side surface of the first lens element and the inner-side surface of the fourth lens element is Td, an axial distance between the inner-side surface of the fourth lens element and an image surface is BL, and the following condition is satisfied:

$2.20<Td/BL<5.0$.

20. The electronic device of claim 15, wherein the central thickness of the first lens element is CT1, the axial distance between the first lens element and the second lens element is T12, and the following condition is satisfied:

$0.50<CT1/T12<1.50$.

21. The electronic device of claim 15, wherein the outer-side surface of the second lens element has at least one convex critical point in an off-axis region thereof.

22. The electronic device of claim 15, wherein a refractive index of the fourth lens element is N4, and the following condition is satisfied:

$8.0<V4/N4<12.0$.

23. The electronic device of claim 15, wherein a vertical distance between a critical point on the outer-side surface of the first lens element and an optical axis is Yc11, a vertical distance between a critical point on the inner-side surface of the fourth lens element and the optical axis is Yc42, a focal length of the optical lens assembly is f, and the following conditions are satisfied:

$0.12<Yc11/f<0.50$; and $0.40<Yc42/f<1.0$.

* * * * *